(12) United States Patent
Nakagiri

(10) Patent No.: US 6,896,426 B2
(45) Date of Patent: May 24, 2005

(54) DOCUMENT PROCESSING SYSTEM, INFORMATION PROCESSING APPARATUS, AND SETTING METHODS THEREFOR

(75) Inventor: Koji Nakagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/241,568

(22) Filed: Sep. 12, 2002

(65) Prior Publication Data

US 2003/0052441 A1 Mar. 20, 2003

(30) Foreign Application Priority Data

Sep. 14, 2001 (JP) ........................................ 2001-280385

(51) Int. Cl.[7] .............................. B41J 11/44; B41J 5/30; G06K 15/00; G06F 15/00
(52) U.S. Cl. .......................... 400/76; 400/61; 358/1.13; 358/1.14; 358/1.18
(58) Field of Search ..................... 400/76, 61; 101/484, 101/483; 358/1.13, 1.14, 1.18; 270/58.19

(56) References Cited

U.S. PATENT DOCUMENTS

| | | | |
|---|---|---|---|
| 5,008,709 A * | 4/1991 | Shinada et al. ................ | 399/86 |
| 5,098,002 A | 3/1992 | Hansch et al. ................. | 227/90 |
| 5,191,429 A * | 3/1993 | Rourke ........................ | 358/296 |
| 5,464,199 A | 11/1995 | Stauber .................... | 270/52.18 |
| 5,590,828 A | 1/1997 | Stauber ........................ | 227/81 |
| 5,598,258 A * | 1/1997 | Sato et al. ...................... | 399/85 |
| 5,774,232 A * | 6/1998 | Tabata et al. ................ | 358/448 |
| 5,881,337 A * | 3/1999 | Higashikawa et al. ........ | 399/82 |
| 6,075,519 A * | 6/2000 | Okatani et al. ............. | 345/173 |
| 6,115,510 A | 9/2000 | Koga .......................... | 382/309 |
| 6,331,896 B1 * | 12/2001 | Morita ....................... | 358/1.18 |
| 6,539,114 B1 * | 3/2003 | Shimazawa .................. | 382/195 |
| 6,622,624 B1 | 9/2003 | Divine et al. ................ | 101/484 |
| 6,628,311 B1 | 9/2003 | Fang .......................... | 715/777 |
| 2001/0044868 A1 | 3/2001 | Roztocil et al. ............. | 358/1.1 |
| 2002/0051204 A1 | 6/2001 | Ohara ........................ | 358/1.16 |
| 2002/0085040 A1 * | 7/2002 | Krolczyk et al. ........... | 345/777 |
| 2003/0029875 A1 * | 2/2003 | Sesek ......................... | 220/589 |

FOREIGN PATENT DOCUMENTS

| | | |
|---|---|---|
| EP | 10 74 397 A1 | 2/2001 |
| JP | 2002-113968 A | 4/2002 |
| JP | 2002-254754 A | 9/2002 |
| JP | 2003-091383 A | 3/2003 |

OTHER PUBLICATIONS

U.S. Appl. No. 09/595,885, filed Jun. 20, 2000.
U.S. Appl. No. 10/238,693, filed Sep. 11, 2002.
U.S. Appl. No. 10/241,704, filed Sep. 12, 2002.

* cited by examiner

Primary Examiner—Andrew H. Hirshfeld
Assistant Examiner—Wasseem H. Hamdan
(74) Attorney, Agent, or Firm—Fitzpatrick, Cella, Harper & Scinto

(57) ABSTRACT

When a user sets, from a user interface window using a bookbinding application, instructions of dividing a document into a plurality of parts and stapling each part of the document, a printer driver generates one job in which the staple attribute of a binder corresponding to each part is set to "ON" or "OFF", and issues the job for a printer. With this operation, the user can perform staple designation to an arbitrary part of the document, and can realize a plurality of staple processes in one print job.

28 Claims, 26 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | · Z-FOLD IS DESIGNATED WHEN "A4 + A3", "B4 + B3", OR "LETTER + LEDGER (11 × 17)" IS DESIGNATED<br>· ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | · SELECTABLE ONLY FOR FIXED SIZE |
| 4 | BINDING MARGIN / BINDING DIRECTION | | · SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | · LAYOUT POSITION: NINE PATTERNS<br>· X1 PRINTING CAN BE DESIGNATED |
| 6 | ENLARGEMENT / REDUCTION | ON / OFF | ON IS AUTOMATICALLY DESIGNATED WHEN PAPER SIZE IS FIXED SIZE OR N-up PRINTING IS SELECTED. CAN BE SET TO OFF |
| 7 | WATERMARK | | · WATERMARK CAN BE DESIGNATED INDIVIDUALLY IN LOGICAL OR PHYSICAL PAGES<br>· ALL CHAPTERS / PAGES ARE TARGETED |

FIG. 4B

| # | | | |
|---|---|---|---|
| 8 | HEADER / FOOTER | | • HEADER / FOOTER CAN BE DESIGNATED INDIVIDUALLY IN LOGICAL OR PHYSICAL PAGES<br>• ALL CHAPTERS / PAGES ARE TARGETED |
| 9 | DISCHARGE METHOD | STAPLE / PUNCH HOLE | • STAPLING / PUNCHING ONLY IN SINGLE- / DOUBLE-SIDED PRINTING<br>• STAPLING AT ONE / TWO POSITIONS |
| 10 | DETAILS OF BOOKBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON IS AUTOMATICALLY DESIGNATED WHEN PAPER SIZE IS FIXED SIZE OR N-up PRINTING IS SELECTED. CAN BE SET TO OFF. |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS/FOOTERS DESIGNATED BY BOOK IS DESIGNATED |
| 4 | ZOOM | 50% - 200% | • ZOOM RATIO RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 20

| |
|---|
| PRINTING METHOD ~2001 |
| BINDING DIRECTION ~2002 |
| BINDING WIDTH ~2003 |
| ORIGINAL ADJUSTMENT ~2004 |
| STAPLE DESIGNATION ~2005 |
| STAPLE POSITION ~2006 |
| PUNCH HOLE ~2007 |
| Z-HOLD ~2008 |
| CHAPTERING ~2009 |
| OTHERS ~2010 |

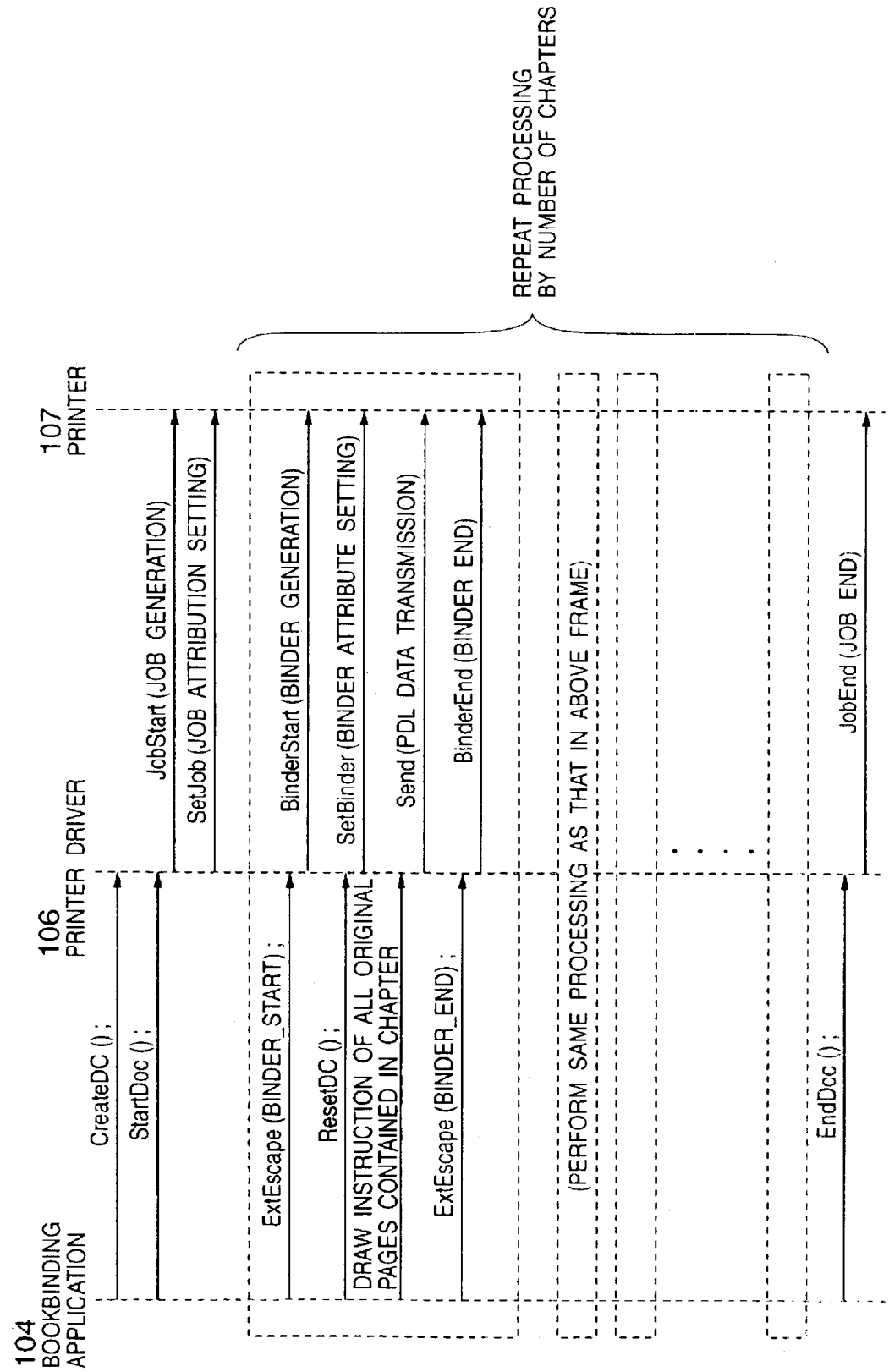

DOCUMENT PROCESSING SYSTEM, INFORMATION PROCESSING APPARATUS, AND SETTING METHODS THEREFOR

FIELD OF THE INVENTION

The present invention relates to a document processing system, constituted by a printing apparatus with a staple function and an information processing apparatus connected to the printing apparatus, the information processing apparatus, setting methods for the document processing system and information processing apparatus, a program, and a storage medium.

BACKGROUND OF THE INVENTION

Different types of data such as characters, tables, and images require different structures which define the data and different editing operations for the data. Various application programs are provided in accordance with the type of data. The user uses different application programs for different types of data to be edited, e.g., a character processing program in order to edit characters, a spreadsheet program in order to edit tables, and an image editing program in order to edit images.

In this way, the user generally uses different application programs for different types of data to be edited. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

To print a plurality of copies of a document during editing on the information processing apparatus such as a personal computer while stapling each copy, in general, one copy of the document is printed by a printing apparatus such as a printer, and the obtained print material is used as an original. This original is copied by a copying machine capable of stapling while defining a staple instruction and designating the number of copies.

A printing apparatus such as a printer or copying machine which can directly designate staple setting when an information processing apparatus is to print a document has recently been put to practical use.

However, to assign page numbers to pages when the user creates one target document by combining print materials by various applications, he/she must print out all necessary data, combine them into a document, and determine page numbers. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed such that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. The many manual operations readily generate errors.

The use of the integrated application for creating a target document enables arranging various data in the data state without printing them out. No heavy labor is required as compared with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at a portion where the format is changed, and print a target page again. This leads to much labor and low productivity, similar to the above-mentioned method.

In staple control, the conventional printer employs a method of designating to a printer job whether to perform stapling. The conventional printer can designate to staple a whole document together, but cannot designate to staple a specific range of the document. Therefore, a plurality of parts of one document and only one part of a document cannot be stapled. To staple the specific part of a document, a method is available in which a partial printing function of the application is used to repeat partial printing of a part to be stapled. However, this method is cumbersome and generates a plurality of print jobs in printing one document. Unlike the general print job, print job control such as stop of printing and status display must be performed for the plurality of print jobs. In addition, interrupts may be generated from other print jobs in a shared printer connected to the network.

SUMMARY OF THE INVENTION

The present invention has been made in consideration of the prior art, and has as its object to provide a document processing system which allows the user to give a staple instruction to an arbitrary part of a document, an information processing apparatus, setting methods of the document processing system and information processing apparatus, a program, and a storage medium.

It is another object of the present invention to provide a document processing system which can realize a plurality of staple processes by one print job, an information processing apparatus, setting methods of the document processing system and information processing apparatus, a program, and a storage medium.

To achieve the above object, according to an aspect of the present invention, there is provided a document processing system constituted by a printing apparatus with a staple function and information processing apparatus connected to the printing apparatus, comprising; setting means for dividing a document into a plurality of parts, and setting a partial staple instruction which instructs each of the plurality of parts whether to perform stapling; generation means for generating print data in accordance with the partial staple instruction set by the setting means; and staple means for stapling each of the plurality of parts of the document on the basis of the generated print data.

According to another aspect of the present invention, there is provided a document processing system constituted by a printing apparatus with a staple function and information processing apparatus connected to the printing apparatus, comprising; designation means for designating whether to staple a whole document or each of a plurality of parts of the document; generation means for generating print data of the document into one job when the whole document is designated to be stapled, and generating print data in a plurality of jobs for jobs designated for stapling and jobs designated not for stapling when each of the plurality of parts of the document is designated to be stapled; and staple means for stapling the whole document or each of the plurality of parts of the document on the basis of the generated print data.

According to still another aspect of the present invention, there is provided an information processing apparatus connected to a printing apparatus with a staple function, comprising; setting means for dividing a document into a plurality of parts, and setting a partial staple instruction which instructs each of the plurality of parts whether to perform stapling; and generation means for generating print data in accordance with the partial staple instruction set by the setting means.

According to still another aspect of the present invention, there is provided an information processing apparatus connected to a printing apparatus with a staple function, comprising; designation means for designating whether to staple a whole document or each of a plurality of parts of the document; and generation means for generating print data of the document into one job when the whole document is designated to be stapled, and generating print data in a plurality of jobs for jobs designated for stapling and jobs designated not for stapling when each of the plurality of parts of the document is designated to be stapled.

According to still another aspect of the present invention, there is provided a method of setting a document processing system constituted by a printing apparatus with a staple function and information processing apparatus connected to the printing apparatus, comprising; the setting step of dividing a document into a plurality of parts, and setting a partial staple instruction which instructs each of the plurality of parts whether to perform stapling; the generation step of generating print data in accordance with the partial staple instruction set in the setting step; and the staple step of stapling each of the plurality of parts of the document on the basis of the generated print data.

According to still another aspect of the present invention, there is provided a method of setting a document processing system constituted by a printing apparatus with a staple function and information processing apparatus connected to the printing apparatus, comprising; the designation step of designating whether to staple a whole document or each of a plurality of parts of the document; the generation step of generating print data of the document into one job when the whole document is designated to be stapled, and generating print data in a plurality of jobs for jobs designated for stapling and jobs designated not for stapling when each of the plurality of parts of the document is designated to be stapled; and the staple step of stapling the whole document or each of the plurality of parts of the document on the basis of the generated print data.

According to still another aspect of the present invention, there is provided a method of setting an information processing apparatus connected to a printing apparatus with a staple function, comprising; the setting step of dividing a document into a plurality of parts, and setting a partial staple instruction which instructs each of the plurality of parts whether to perform stapling; and the generation step of generating print data in accordance with the partial staple instruction set in the setting step.

According to still another aspect of the present invention, there is provided a method of setting an information processing apparatus connected to a printing apparatus with a staple function, comprising; the designation step of designating whether to staple a whole document or each of a plurality of parts of the document; and the generation step of generating print data of the document into one job when the whole document is designated to be stapled, and generating print data in a plurality of jobs for jobs designated for stapling and jobs designated not for stapling when each of the plurality of parts of the document is designated to be stapled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are tables showing a list of book attributes;

FIG. 5 is a table showing a list of chapter attributes;

FIG. 6 is a table showing a list of page attributes;

FIG. 20 is a view showing document finishing information in a field 1902 shown in FIG. 19 in more detail;

FIG. 25 is a view showing a print sequence among the bookbinding application 104, a printer driver 106, and a printer 107.

DETAILED DESCRIPTION OF THE PREFERRED EMBODIMENT

An embodiment according to the present invention will be described in detail in accordance with the accompanying drawings.

<General Description of System>

A document processing system according to the present invention will be generally described with reference to FIGS. 1 to 12. This document processing system includes an electronic original writer which converts a data file created by a general application into an electronic original file, and a bookbinding application which provides a function of editing the electronic original file. The document processing file enables creating and editing a document made up of created data, and increases the operability to efficiently edit the document.

<System Configuration and Operation>

Figure 1:
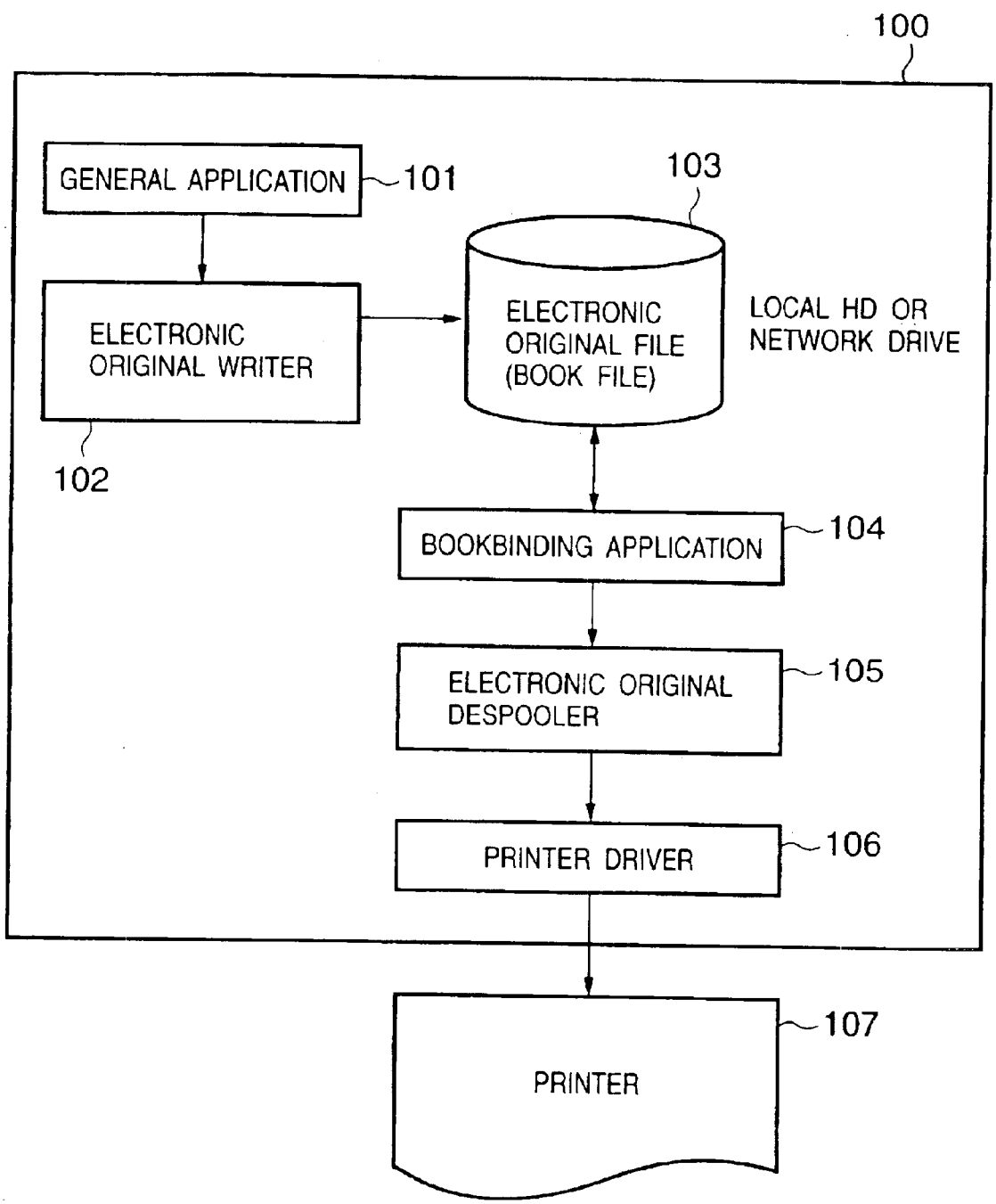
FIG. 1 is a block diagram showing a stand-alone document processing system.

FIG. 1 is a block diagram showing the software structure of the document processing system according to this embodiment. The document processing system is implemented by a digital computer 100 (to be also referred to as a host computer hereinafter) as an embodiment suited to the information processing apparatus of the present invention. A general application 101 shown in FIG. 1 is an application program which provides functions such as word processing, spreadsheet, photo-retouch, draw, paint, presentation, and text editing. The general application 101 has a printing function corresponding to the OS. Such applications utilize a predetermined interface (generally called GDI) provided by the OS (Operating System) in printing application data such as created document data or image data. To print created data, the general application 101 transmits an output command (called a GDI function) which is determined in advance for the output module of the OS providing the interface and has an OS-dependent format. The output module which has received the output command converts the output command into a format processible by an output device such as a printer, and outputs the converted command (called a DDI function). Since the format processible by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI (Graphic Device Interface) module.

An electronic original writer 102 is an improvement of the device driver, and is a software module provided to implement the document processing system. The electronic original writer 102 does not target a specific output device, and converts an output command into a format processible by a bookbinding application 104 or printer driver 106 (to be described in detail later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SVG format can be adopted as electronic original formats.

When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an "electronic original file", and an electronic original file given a structure by the bookbinding application 104 will be called a "book file". If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file (or book file) 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 is a program module installed into the computer together with the bookbinding application. The electronic original despooler 105 is a module used to output drawing data to a printer driver in printing a document (book file) used by the bookbinding application. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the received output command into a device command to output it to the printer driver 106 of the designated printer 107. The printer driver 106 converts the output device command into a command such as a page description language interpretable by the printer 107. The converted command is transmitted from the printer driver 106 to the printer 107 via a system spooler (not shown), and the printer 107 prints an image corresponding to the command.

Figure 2:
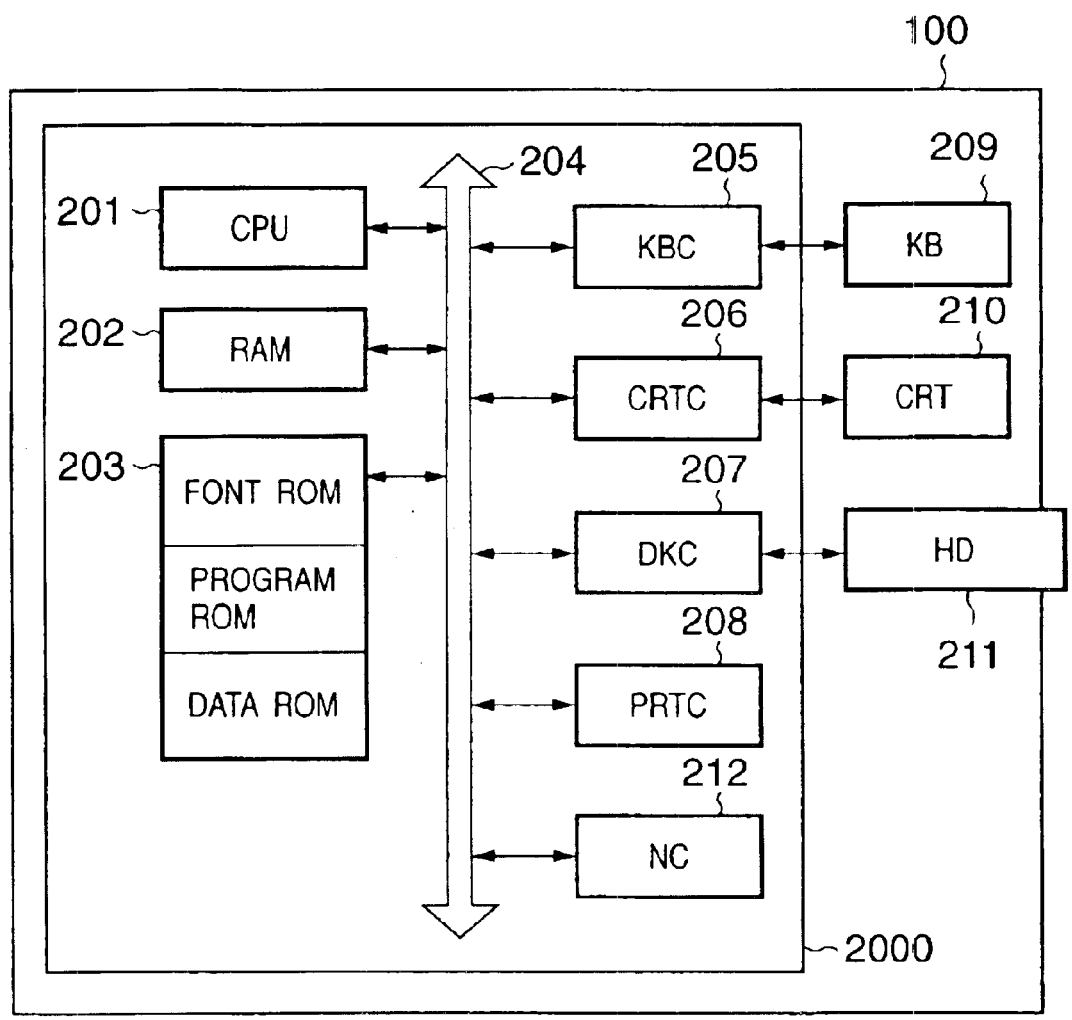
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The RAM 202 functions as the main memory or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may similarly include a plurality of pages.

Figure 3A:
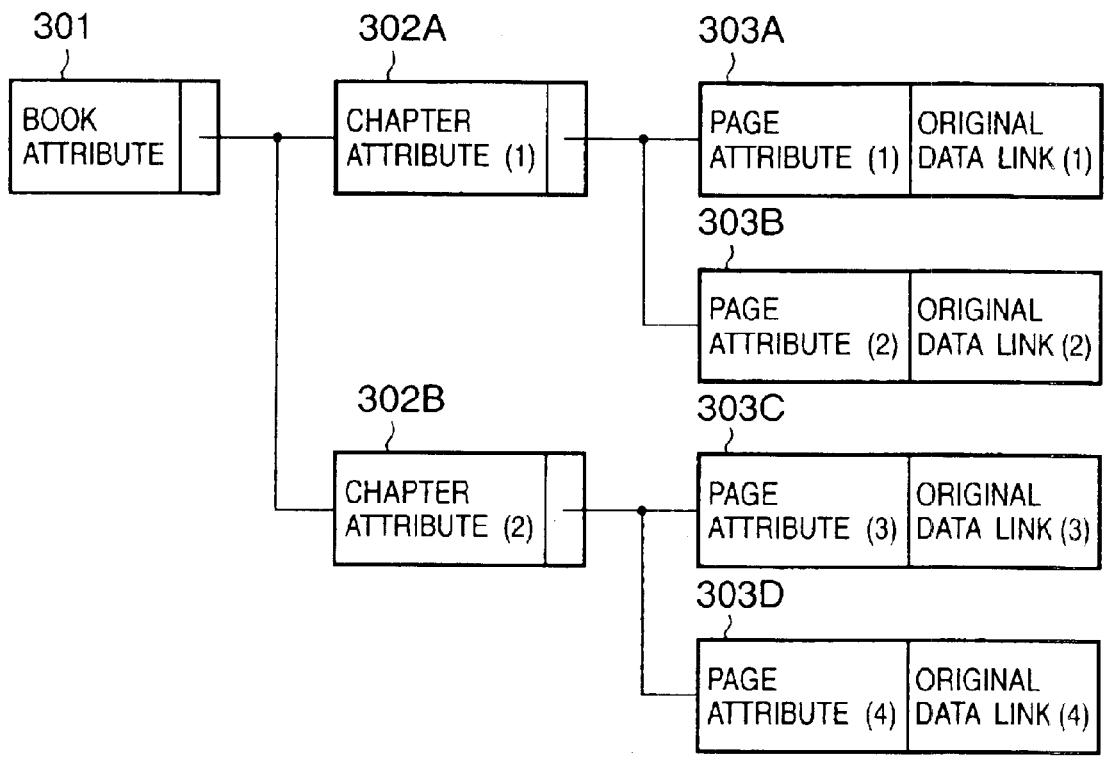
FIGS. 3A and 3B are views showing an example of a book file structure.

FIG. 3A is a block diagram schematically showing an example of the book file format. As shown in FIG. 3A, this example represents a book, chapter, and page in the book file using corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data.

In some cases, a print page to be output onto a paper medium or the like includes a plurality of original pages. This structure is displayed not by a link but by an attribute in the book, chapter, or page layer.

Figure 3B:
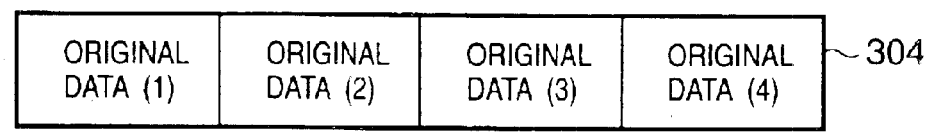

In FIG. 3A, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304, as shown in FIG. 3B, and display that the entities of the pages 303A and 303B are original page data (1) and (2).

FIGS. 4A and 4B show a list of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 4A and 4B does not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

As can be apparent from FIGS. 4A to 6, items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) sheet. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, a continuous chapter is not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

The book file has the above-described structure and contents. Procedures of creating a book file by the bookbinding application 104 and electronic original writer 102 will be explained. Book file generation procedures are realized as part of book file editing operation by the bookbinding application 104.

Figure 7:
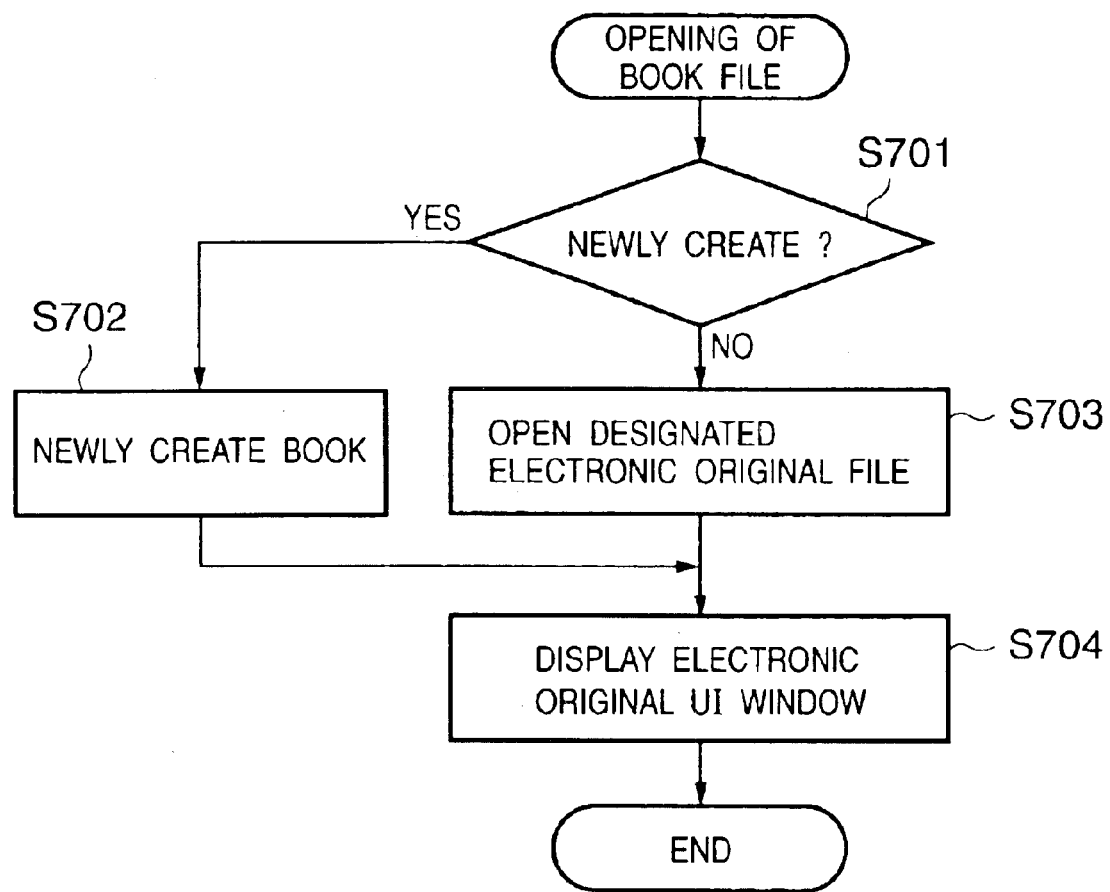
FIG. 7 is a flow chart showing procedures of opening a book file.
Figure 11:
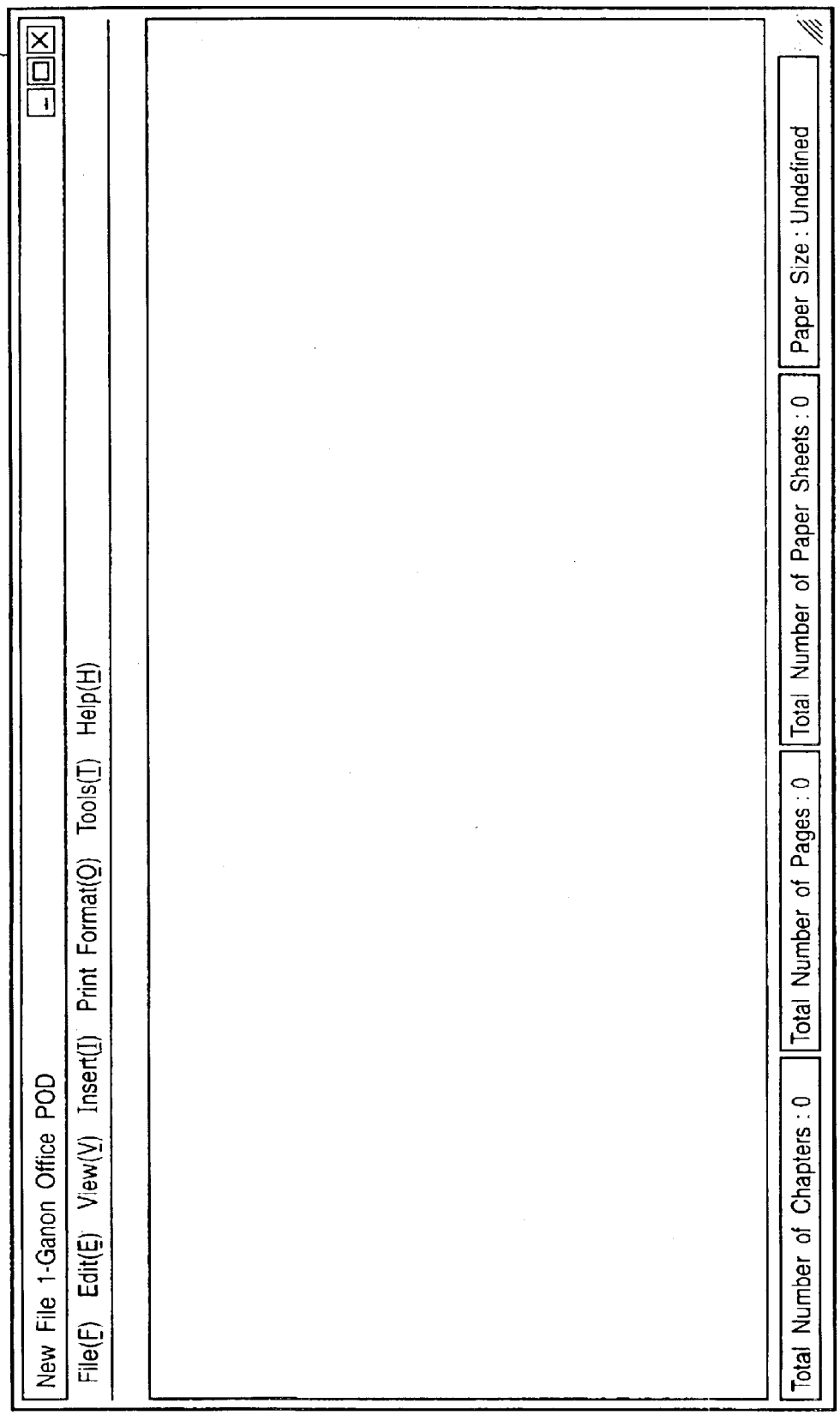
FIG. 11 is a view showing an example of a user interface window when a new book file is opened.

FIG. 7 shows procedures when the bookbinding application 104 opens a book file. Whether a book file to be opened is one to be newly created or an existing one is checked (step S701). If YES in step S701, a book file including no chapter is newly created (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
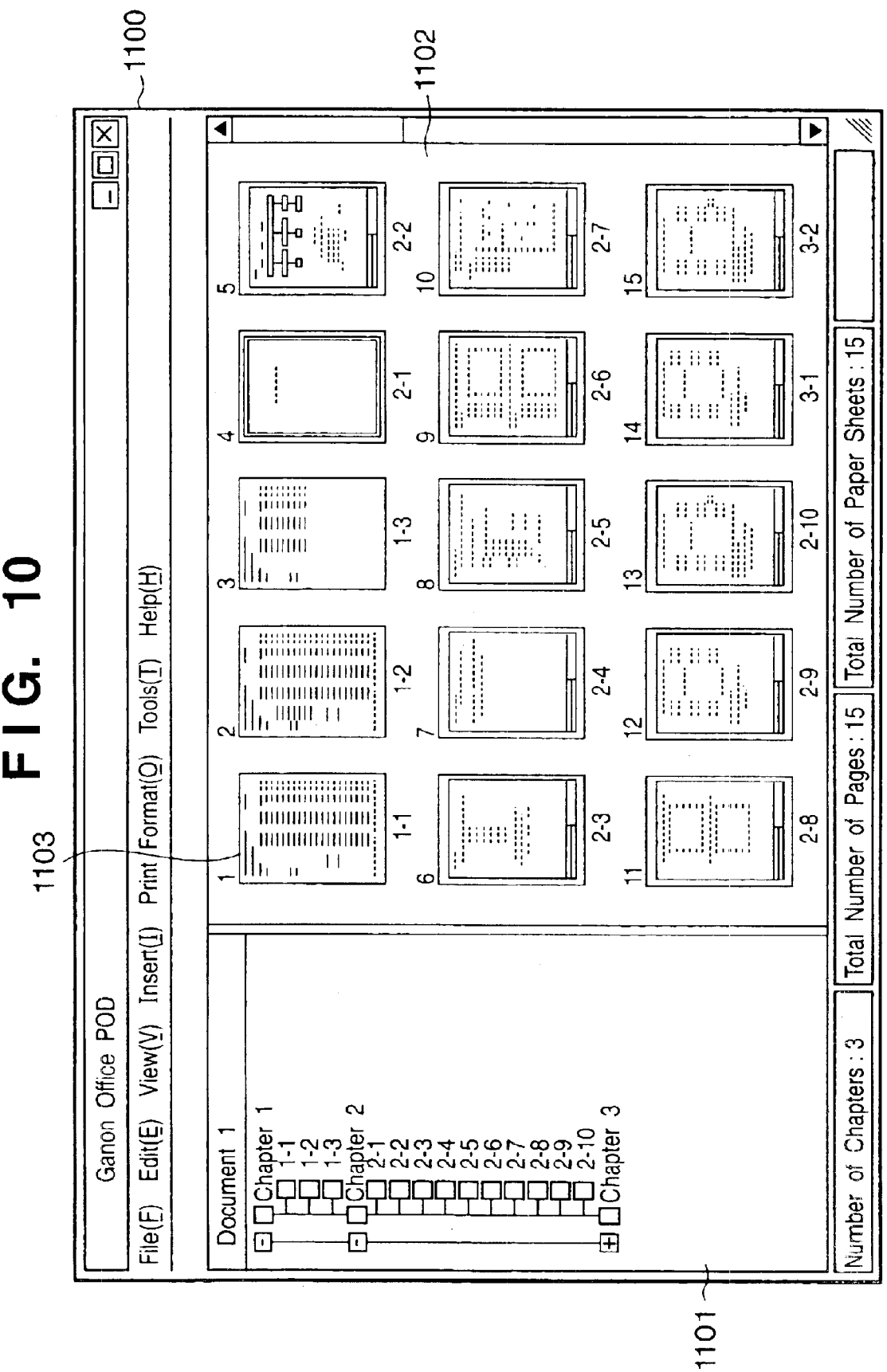
FIG. 10 is a view showing an example of a user interface window when an existing book file is opened.

If NO in step S701, a designated book file is opened (step S703), and a UI (User Interface) window is displayed in accordance with the structure, attribute, and contents of the book file. FIG. 10 shows an example of the UI window which displays the book file designated from the existing book files. The UI window 1100 has a tree portion 1101 representing a book structure, and a preview portion 1102 displaying a state to be printed. The tree portion 1101 displays chapters included in the book and pages included in each chapter by a tree structure, as shown in FIG. 3A. Pages displayed at the tree portion 1101 are original pages. The preview portion 1102 displays reduced print page contents. The display order reflects the book structure.

Application data converted into an electronic original file by the electronic original writer can be added as a new chapter to the open book file. This function is called an electronic original import function. An electronic original is imported to the book file newly created by the procedures of FIG. 7, thereby giving an entity to the book file. This function is activated by drag-and-drop operation of application data to the window of FIG. 10.

Figure 8:
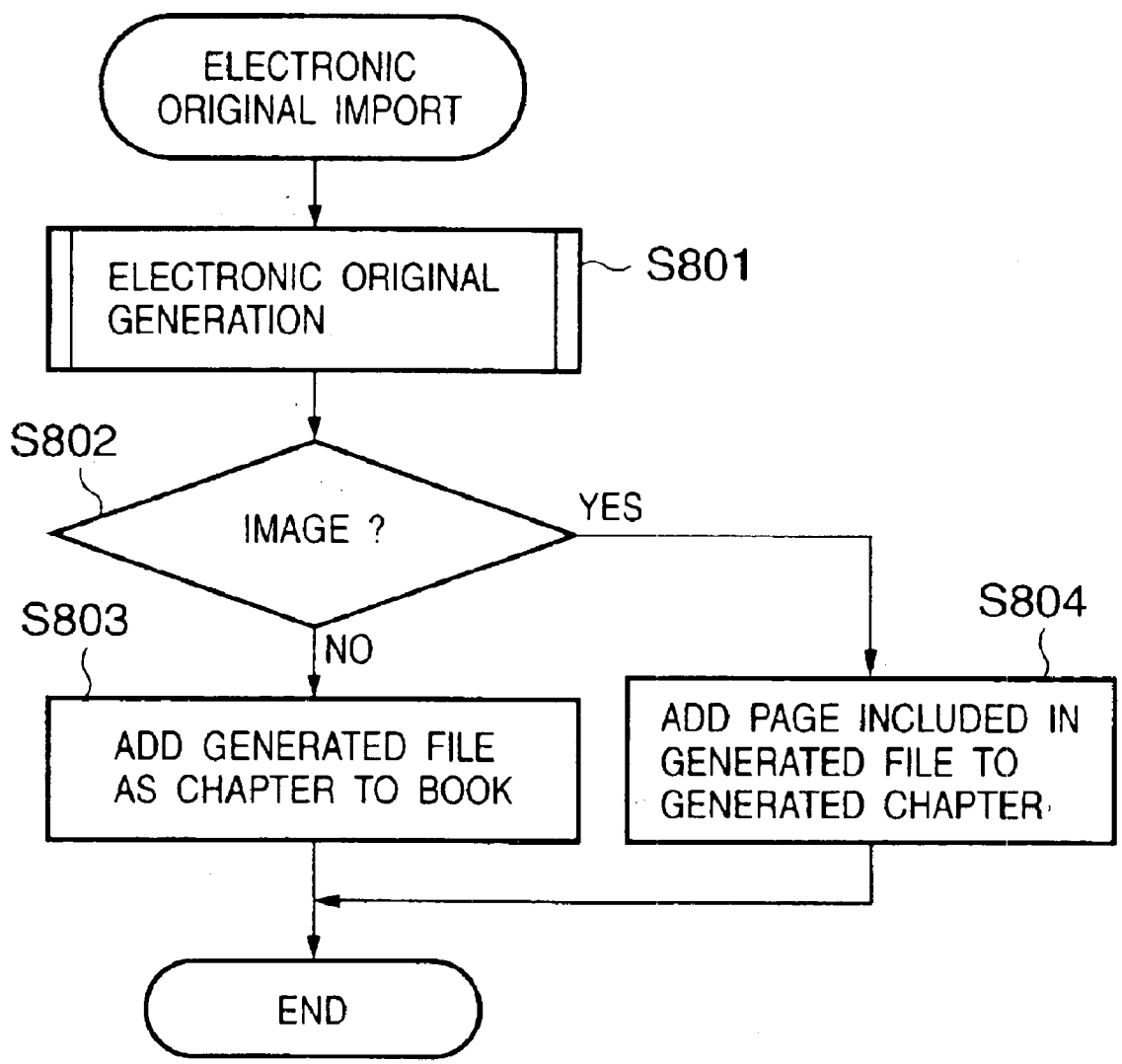
FIG. 8 is a flow chart showing procedures of importing an electronic original file into a book file.

FIG. 8 shows electronic original import procedures. An application program which has generated designated application data is activated. The electronic original writer 102 is designated as a device driver, and prints out application data to convert it into electronic original data (step S801). After conversion, whether the converted data is image data is checked (step S802). This determination can be achieved based on the file extension of the application under the Windows OS. For example, an extension "bmp" represents Windows bitmap data; "jpg", jpeg-compressed image data; and "tiff", tiff-format image data. If YES in step S802, processing in S801 can be skipped because an electronic original file can be directly generated from image data without activating an application in S801.

If NO in step S802, the electronic original file generated in step S801 is added as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 9:
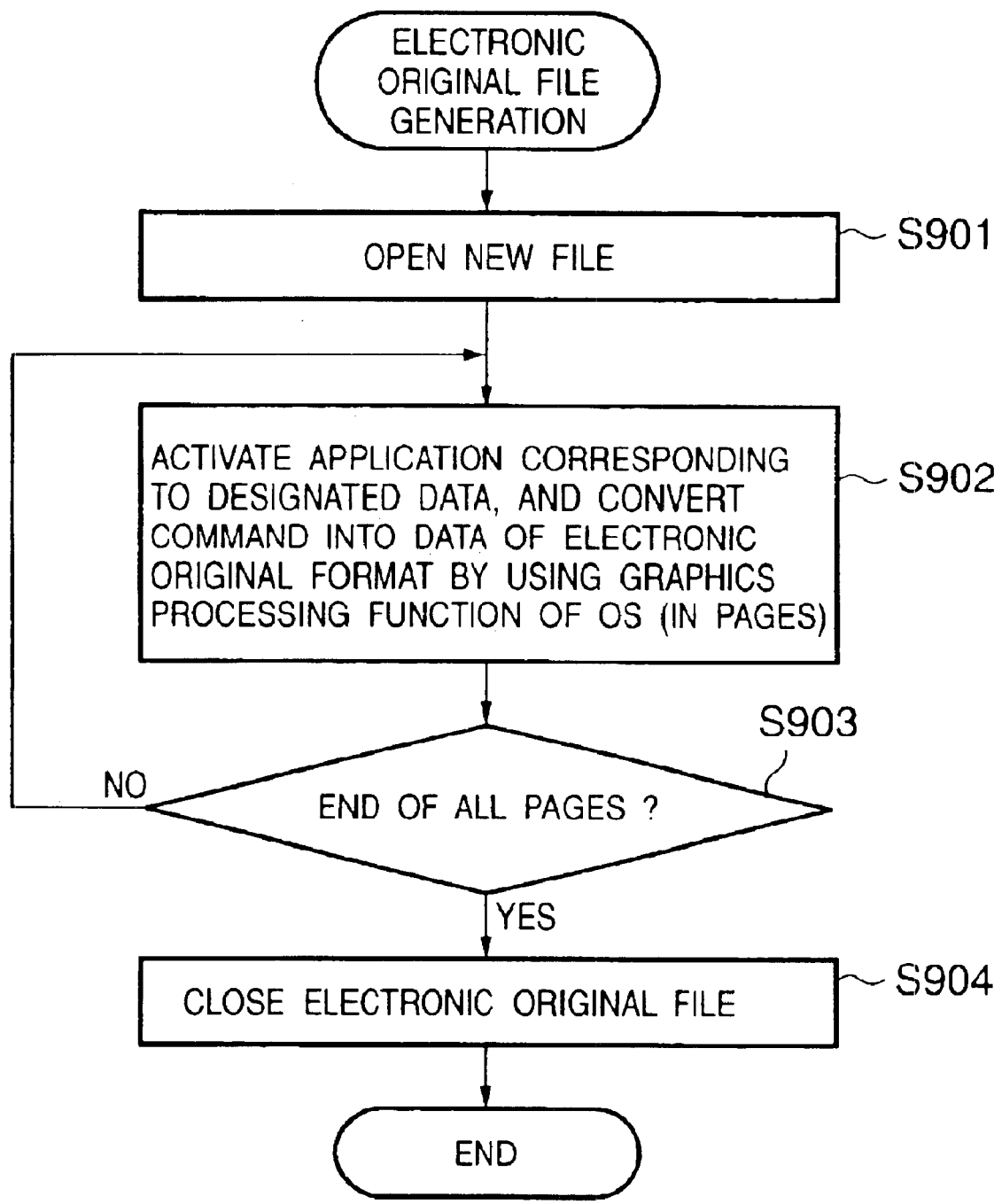
FIG. 9 is a flow chart showing procedures of converting application data into an electronic original file.

FIG. 9 is a flow chart of procedures of generating an electronic original file by the electronic original writer 102 in step S801 shown in FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer 102, and outputs the converted data (step S902). The output destination is the electronic original file opened in step S901. Whether all designated data have been converted is checked (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4A, 4B and 5 or on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application shown in FIG. 10, and selects printing from this menu. Then, the book file is printed out from a designated output device. At this time, the bookbinding application 104 creates a job ticket from a currently open book file, and transfers this job ticket to the electronic original despooler 105. The electronic original despooler 105 converts the job ticket into an OS output command, e.g., a Windows GDI function, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
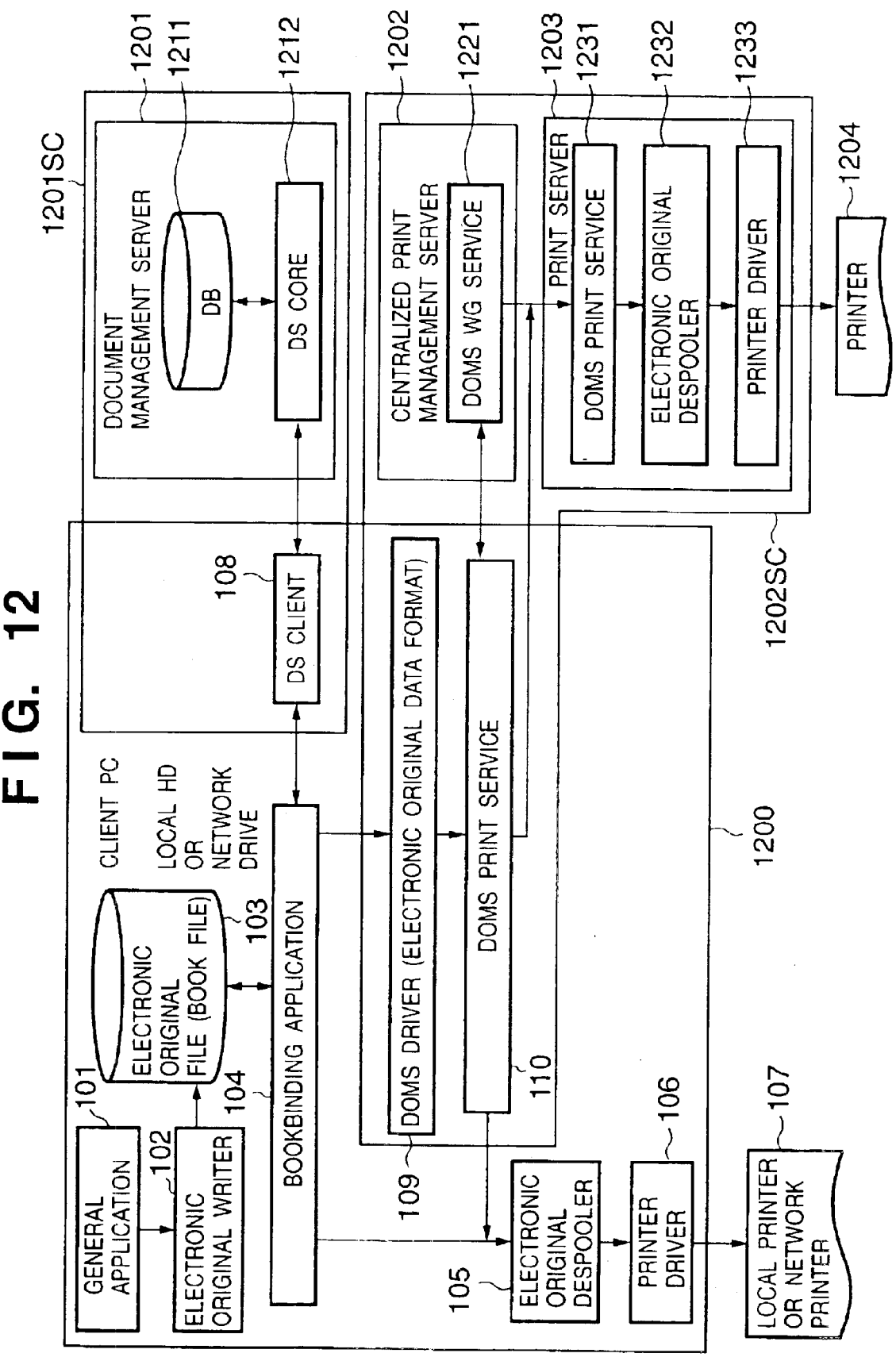
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks.

The document management server 1201 and centralized print management server 1202 are connected to the client in the example shown in FIG. 12, but only either one may exist on the network. For example, if the connected server is the document management server, a document management server-client system 1201SC including the client module 108 is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server executes security check on the qualification of a user who has issued a print request for a saved book file, or saves the print processing log. In this fashion, the document processing system can be implemented as both a stand-alone system and client-server system.

<Contents of Preview Display>

As described above, when the bookbinding application opens a book file, the user interface window 1100 shown in FIG. 10 is displayed. The tree portion 1101 displays a tree representing the structure of the opened book (to be referred to as a "book of interest" hereinafter). At the preview portion, three display methods are prepared in accordance with designation by the user. The first display method is an original view mode in which an original page is directly displayed. In this original view mode, the contents of an original page belonging to the book of interest are reduced and displayed. The display at the preview portion 1102 does not reflect the layout. The second display method is a print view mode. In this print view mode, the preview portion 1102 displays an original page which reflects the layout of the original page. The third display method is a simple print view mode. In this simple print view mode, the display at the preview portion reflects not the contents of each original page but only the layout.

<Staple Control>

Staple control executed by the bookbinding application 104 of the computer 100 connected to a printer having a staple function will be described next.

Figure 13:
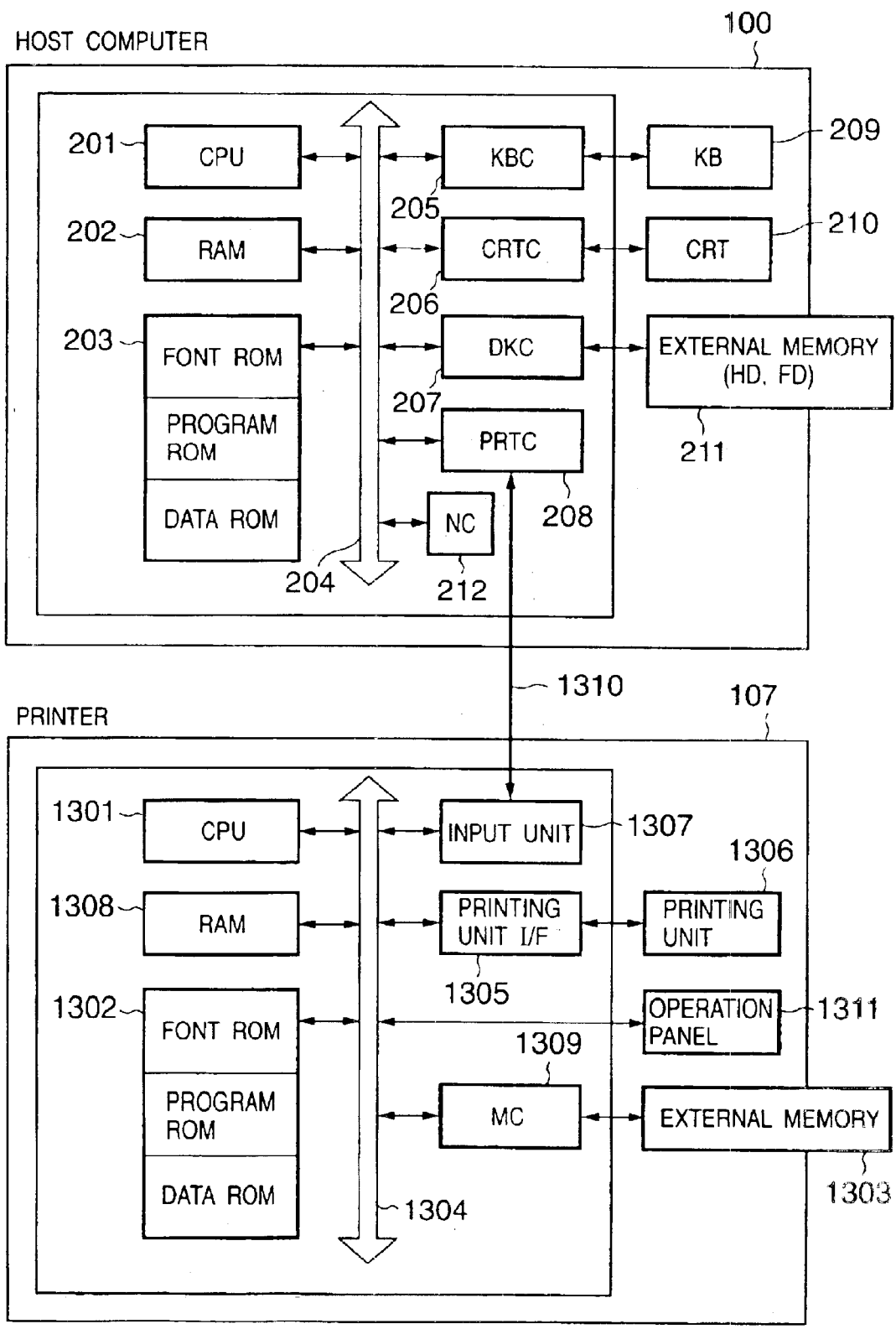
FIG. 13 is a block diagram showing the arrangement of a staple control system.

FIG. 13 is a block diagram showing the arrangement of a staple control system. As shown in FIG. 13, the staple control system is comprised of the host computer 100 shown in FIG. 2 and the printer 107 having the staple function.

The arrangement of the printer 107 will be described below. Note that the present invention can be applied to a single device, a system constituted by a plurality of devices, or a system which performs processing while being connected via a network such as a LAN or WAN as far as the functions of the present invention are realized.

As shown in FIG. 13, in the printer 107, reference numeral 1301 denotes a printer CPU which outputs an image signal as output information to a printing unit (printer engine) 1306 connected via a printer unit I/F 1305 to a system bus 1304 on the basis of a control program stored in the program ROM of a ROM 1302 or a control program stored in an external memory 1303. The program ROM of the ROM 1302 stores the control program of the CPU 1301. The font ROM of the ROM 1302 stores font data used to generate output information. For a printer having no external memory 1303 such as a hard disk, the data ROM of the ROM 1302 stores information used on the host computer 100.

The CPU 1301 can communicate with the host computer 100 via an input unit 1307 and notify the host computer 100 of internal information of the printer 107. A RAM 1308 functions as a main memory, work area, and the like for the CPU 1301, and can expand the memory capacity by an optional RAM connected to an expansion port (not shown).

The RAM 1308 is used as an output information mapping area, environment data storage area, NVRAM, or the like. The external memory 1303 such as a hard disk (HD) or IC card is access-controlled by a memory controller (MC) 1309. The external memory 1303 is connected as an option, and stores font data, emulation programs, form data, and the like. An operation panel 1311 has operation switches, LED indicators, and the like.

The external memory 1303 is not limited to one, and a plurality of external memories can be used. A plurality of external memories can be connected which include an optional font card in addition to a built-in font card and store programs for interpreting the printer control languages of different language systems. Further, the printer 107 may use an NVRAM (not shown) to store printer mode setting information from the operation panel 1311.

Figure 14:
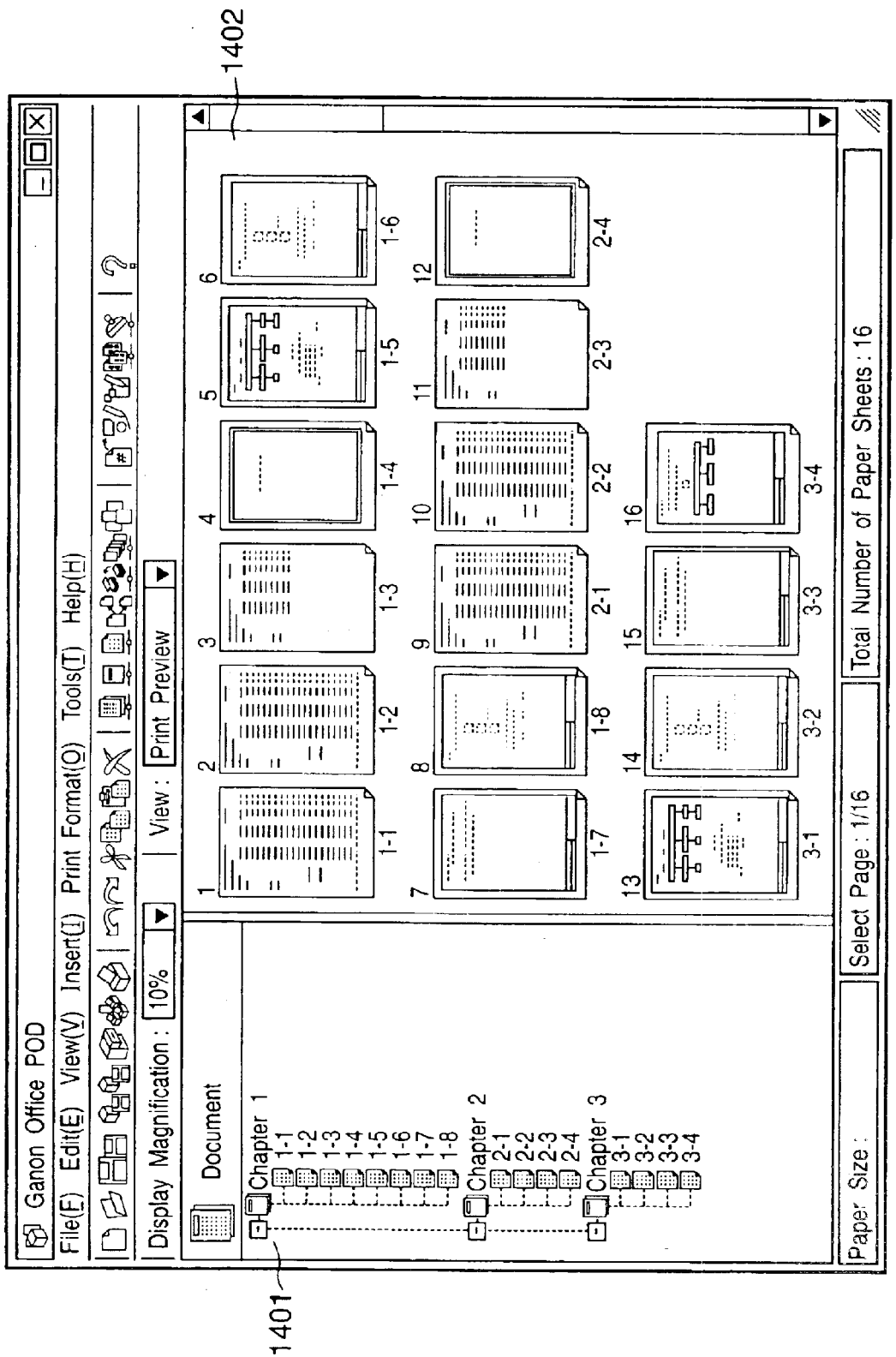
FIG. 14 is a view showing a user interface (UI) window displayed by a bookbinding application 104.

FIG. 14 is a view showing a user interface (UI) window displayed by the bookbinding application 104. As described above, the bookbinding application 104 can perform the function setting, of the printing apparatus, such as staple setting as well as editing such as change of the page order of a document, document copy, and document delete, and can print a document at a designated printing apparatus. A left region 1041 shown in FIG. 14 displays a tree view of a document structure. The document is formed from a plurality of chapters, and each chapter is formed from a set of original pages. A right region 1402 displays a print preview of each page.

Figure 15:
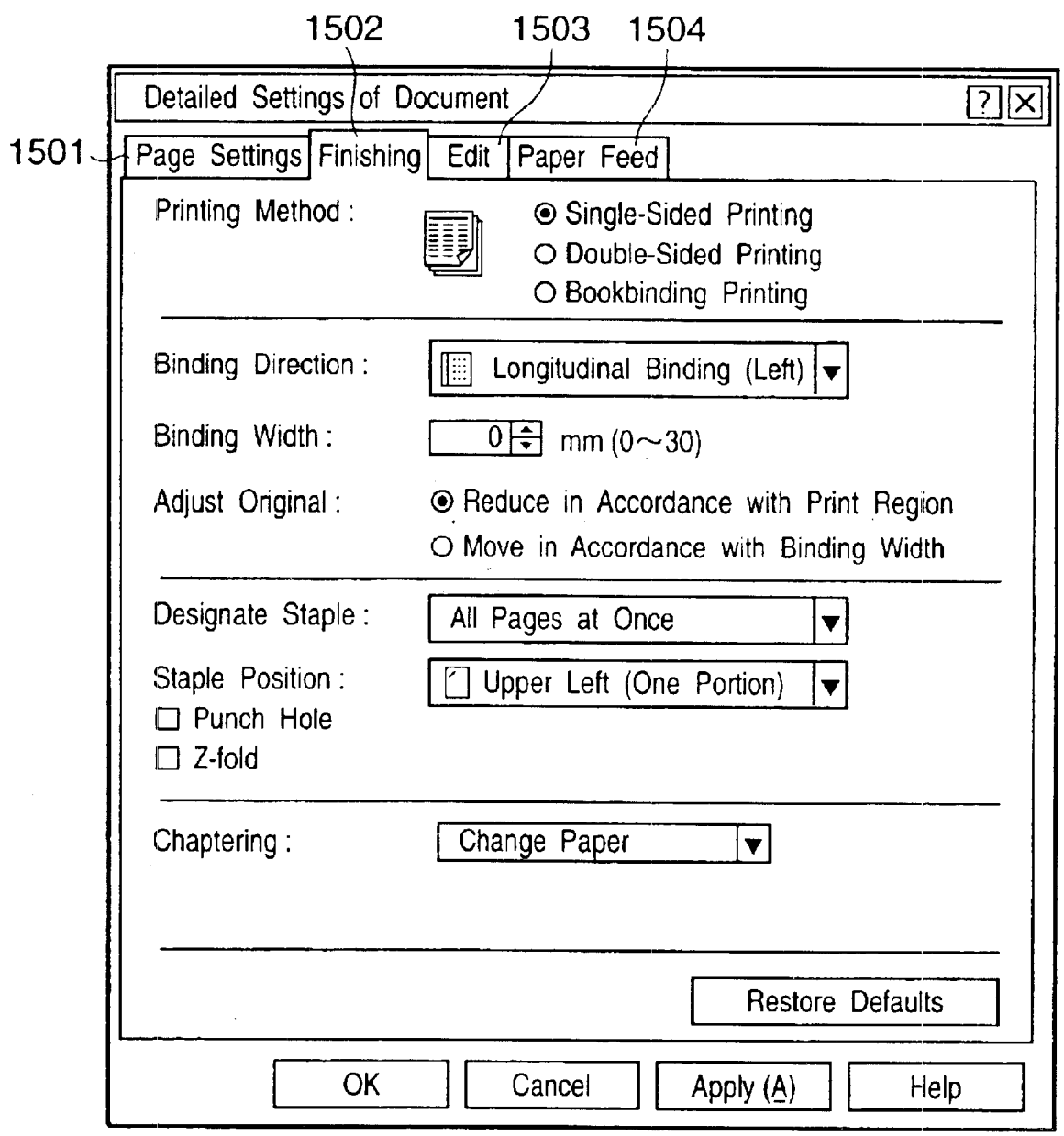
FIG. 15 is a view showing a "detailed settings of document" window by the bookbinding application 104.

FIG. 15 is a view showing the "detailed settings of document" window by the bookbinding application 104. The "detailed settings of document" window is activated from the "detailed settings of document" menu of the editing menu or the "detailed settings of document" button on the tool bar displayed on the UI window shown in FIG. 14. This window is used for setting attributes which influence the whole document. As shown in FIG. 15, this window is constituted by four sheets, "page settings" 1501, "finishing" 1502, "edit" 1503, and "paper feed" 1504. This example shows a state wherein the "finishing" 1502 sheet is displayed. In the "finishing" 1502 sheet, finishing setting can be mainly performed, and staple designation and staple position settings can be instructed.

Figure 16:
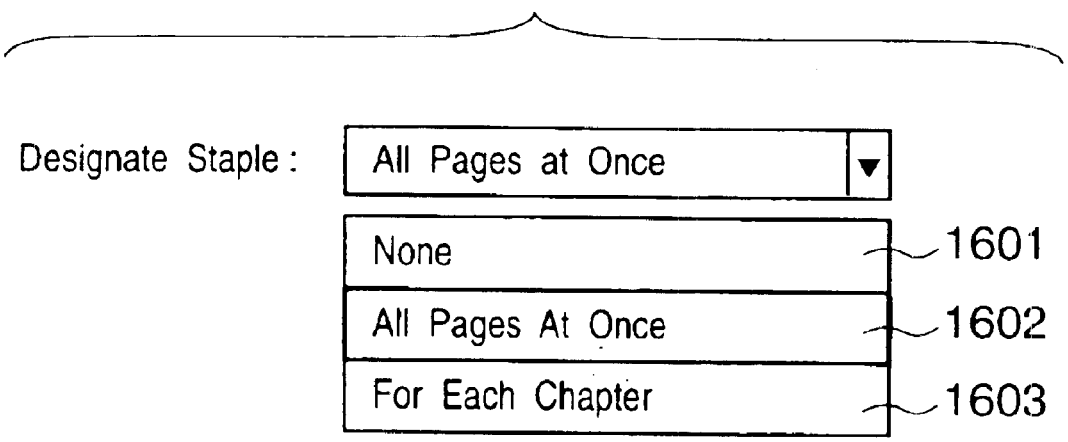
FIG. 16 is a view showing selectable options in a "designate staple" column shown in FIG. 15.

FIG. 16 is a view showing options selectable in the "designate staple" column shown in FIG. 15. Referring to FIG. 16, "none" 1601 means that no staple function is used, "all pages at once" 1602 means that a whole document is bound by one staple, and "for each chapter" 1603 means that each chapter is stapled. In this manner, in addition to an instruction for stapling the whole document, an instruction for stapling each chapter which is a part of the document can be issued. In the document shown in FIG. 14, if the "all pages at once" 1602 is selected, all the 16 pages are stapled altogether. If the "for each chapter" 1603 is selected, the eight pages of the first chapter, the four pages of the second chapter, and the four pages of the third chapter are respectively stapled.

Figure 17:
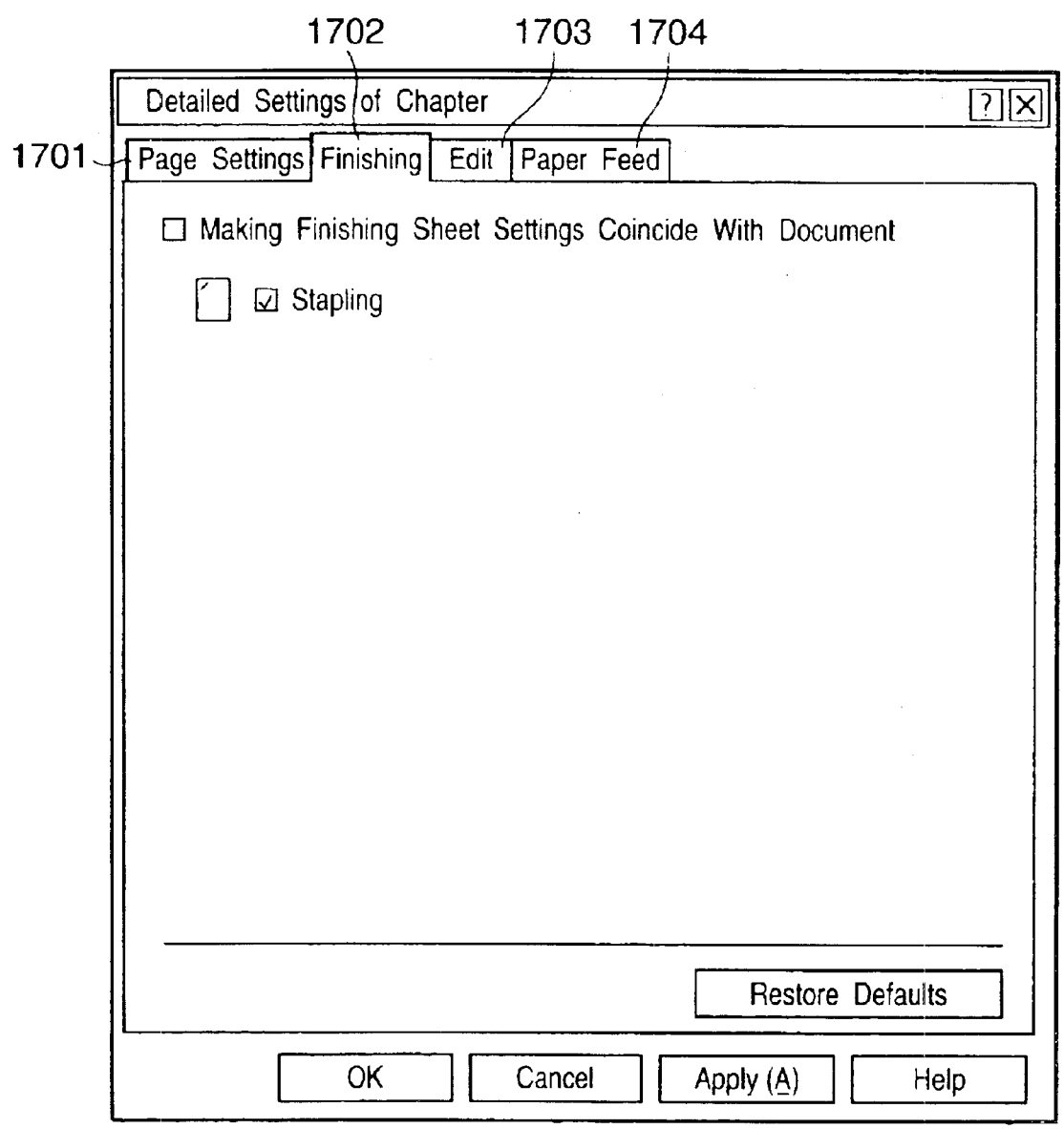
FIG. 17 is a view showing a "detailed settings of chapter" window by the bookbinding application 104.

FIG. 17 is a view showing the "detailed settings of chapter" window by the bookbinding application 104. While a chapter icon in the tree view displayed in the left region 1041 of the UI window shown in FIG. 14 is selected, the "detailed settings of chapter" window can be activated from the "detailed settings of chapter" menu or the "detailed settings of chapter" button on the tool bar. Likewise the "detailed settings of document" window, this window is constituted by four sheets, "page settings" 1701, "finishing" 1702, "edit" 1703, and "paper feed" 1704. This example shows a state wherein the "finishing" sheet 1702 is displayed. The setting items of the "detailed settings of chapter" window are the setting items out of the setting items of the "detailed settings of document" window, which can be changed for each chapter. In the initial state of the "detailed settings of chapter" window, the "making (sheet name) sheet settings coincide with document" (the name of each sheet is parenthesized) check box prepared for each sheet is checked. Each of other items of the "detailed settings of chapter" window is grayed out to make an unchangeable state while the same setting as that of each item designated in "detailed settings of document" is designated in each item. If the "making (sheet name) sheet settings coincide with document" check box is canceled, each item of the "detailed settings of chapter" window changes to a changeable state.

In the "detailed settings of document" window shown in FIG. 15, if the "all pages at once" 1602 as shown in FIG. 16 is designated as the "designate staple", since the instruction for stapling the document altogether is designated to the document, no settings for each chapter is changeable in the "detailed settings of chapter" window. That is, the "making finishing sheet settings coincide with document" check box is OFF and grayed out, so it is in the unchangeable state. Similarly, the "stapling" check box displayed under the "making finishing sheet settings coincide with document" check box is OFF and grayed out, so it is unchangeable.

On the other hand, if the "for each chapter" 1603 is designated as the "designate staple" in the "detailed settings of document" window shown in FIG. 15, the "making finishing sheet settings coincide with document" check box of the "detailed settings of chapter" window is ON, and the "stapling" check box displayed thereunder is OFF and grayed out. In this case, when the "making finishing sheet settings coincide with document" check box is checked, the "stapling" check box becomes changeable. In this state, if the "stapling" check box is canceled, the setting can be changed such that only a corresponding chapter is not stapled.

In addition, if the "none" 1601 is designated as the "designate staple" in the "detailed settings of document" window shown in FIG. 15, since an instruction of no stapling is designated to the document, no settings for each chapter are changed in the "detailed settings of chapter" window. That is, the "making finishing sheet settings coincide with document" check box on the "detailed settings of chapter"

window is OFF and grayed out, so it is in the unchangeable state. Similarly, the "stapling" check box displayed under the "making finishing sheet settings coincide with document" check box is OFF and grayed out, so it is unchangeable. Note that this embodiment exemplifies the case wherein the staple setting is unchangeable in the "detailed settings of chapter" window when the document setting is set not to be stapled. However, similar to the case wherein the "for each chapter" is designated as the staple designation of the document, the staple designation for each chapter may be changeable.

When a user is to designate a staple range in a document, he/she edits the document to form one chapter out of a set of pages to be stapled, and designates "for each chapter" in the "designate staple" in the "detailed settings of document" window, thereby designating staple setting for each chapter. When a user is to designate such that the chapter is not stapled, he/she selects the chapter not to be stapled, activates the "detailed settings of chapter" window, and cancels the "making finishing sheet settings coincide with document" check box to cancel the "stapling" check box. With this operation, in addition to a setting means for stapling the whole document altogether, a means for setting whether each chapter is stapled or not can be provided.

Figure 18:
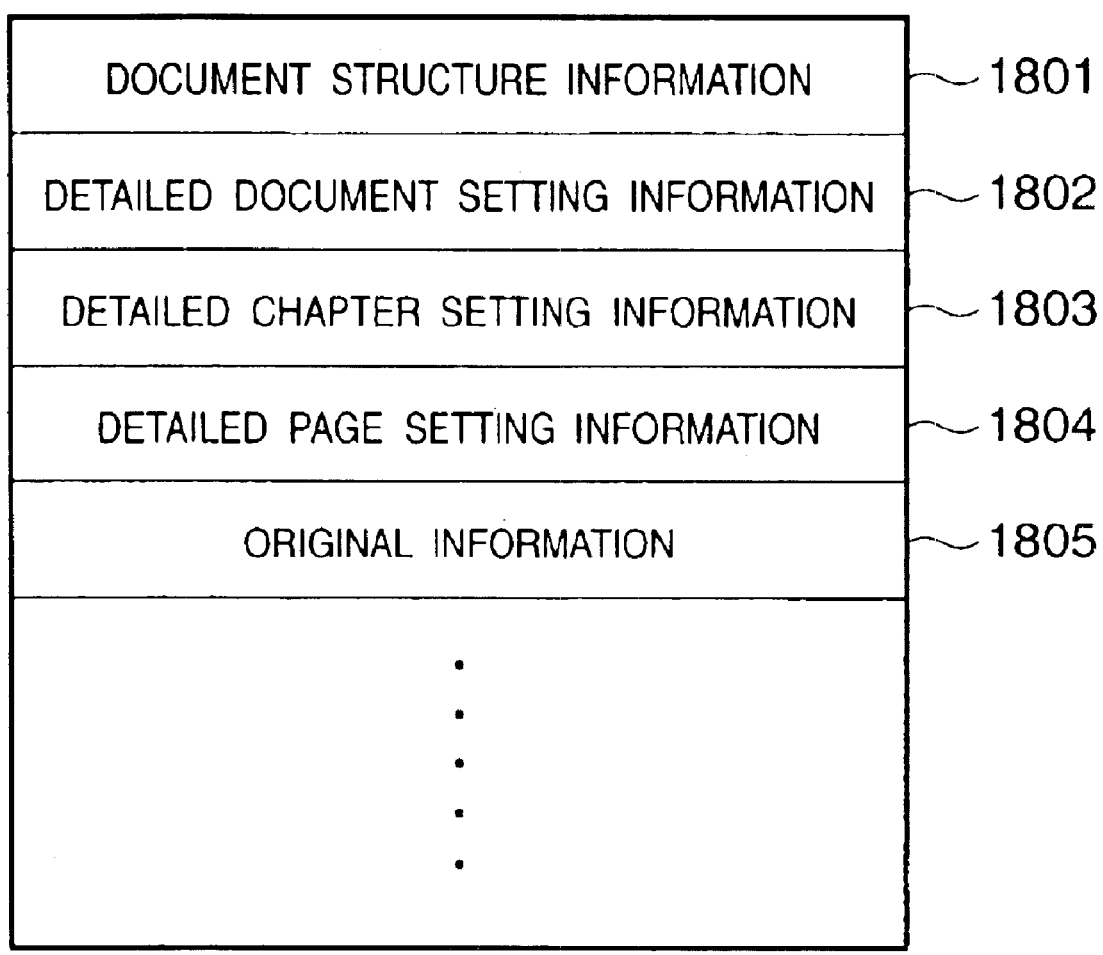
FIG. 18 is a view showing the data structure of a book file 103 handled by the bookbinding application 104.

FIG. 18 is a view showing the data structure of the document file 103 handled by the bookbinding application 104. Referring to FIG. 18, a field 1801 records document structure information, i.e., information about a document structure displayed on the tree view of the UI window of the bookbinding application 104 shown in FIG. 14. A field 1802 records detailed document setting information, i.e., information set in the "detailed settings of document" window shown in FIG. 15. A field 1803 records detailed chapter setting information, i.e., information set in the "detailed settings of chapter" window shown in FIG. 17. A field 1804 records detailed page setting information, i.e., information settable for each page. Like the case wherein the detailed settings of the document can be changed in the "detailed settings of chapter" window, in the "detailed settings of page" window, settings about setting items to be changeable for each page can be saved with respect to the detailed settings of the document and chapter. A field 1805 records original information, i.e., drawing information of each original page. Pieces of information used for the preview display in the right region of FIG. 14 are saved in pages. The book file 103 contains information necessary for each document, and a description thereof will be omitted.

Figure 19:
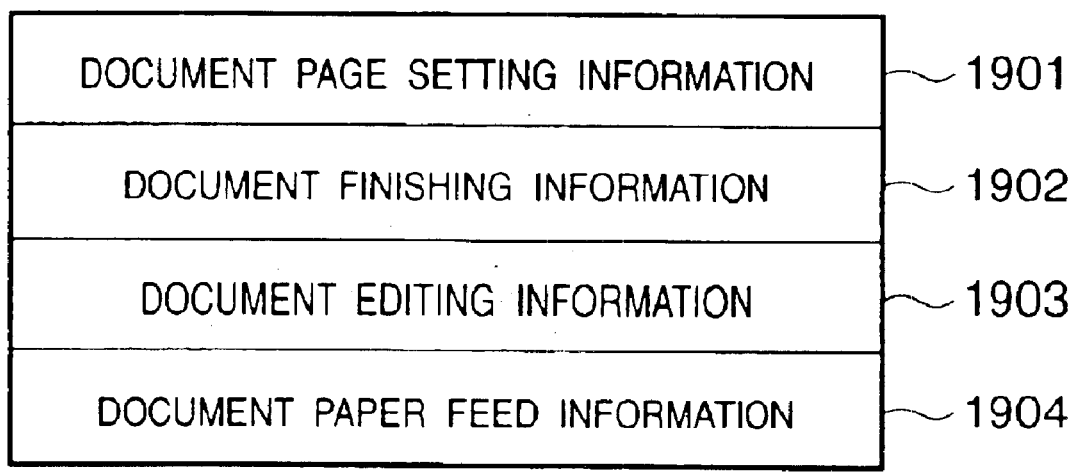
FIG. 19 is a view showing detailed document setting information in a field 1802 shown in FIG. 18 in more detail.

FIG. 19 is a view showing detailed document setting information of the field 1802 shown in FIG. 18 in more detail. Referring to FIG. 19, a field 1901 stores document page setting information; a field 1902, document finishing information; a field 1903, document editing information; and a field 1904, document paper feed information. These pieces of information coincide with contents set on the "page settings" 1501, "finishing" 1502, "edit" 1503, and "paper feed" 1504 sheets of the "detailed settings of document" window shown in FIG. 15.

FIG. 20 is a view showing document finishing information of the preview portion 1902 shown in FIG. 19 in more detail. Referring to FIG. 20, a field 2001 stores a printing method; a field 2002, a binding direction; a field 2003, a binding width; a field 2004, original adjustment; a field 2005, staple designation; a field 2006, a staple position; a field 2007, a punch hole; a field 2008, the presence/absence of Z-fold; a field 2009, a chapter break; and a field 2010, other settings. These pieces of information coincide with contents set on the "finishing" 1502 sheet of the "detailed settings of document" window shown in FIG. 15.

The field 2010 contains settings (not shown: for example, settings such as saddle stitch and center binding margin which become valid only in bookbinding printing) necessary when bookbinding printing is designated as the printing method 2001, a description of which will be omitted.

Figure 21:
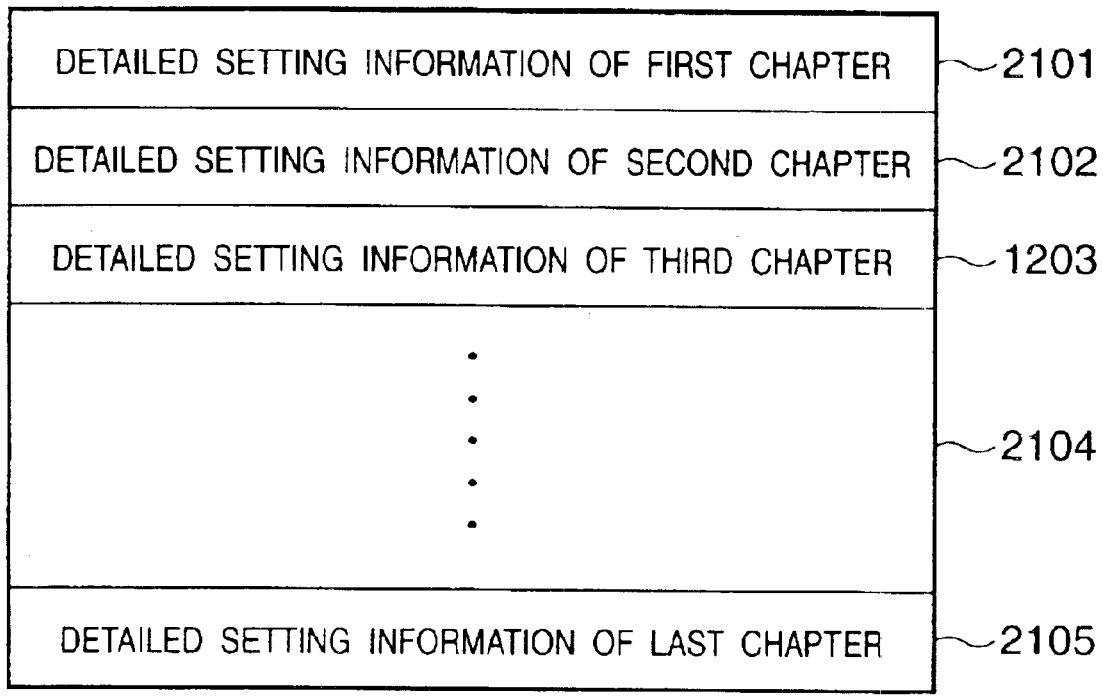
FIG. 21 is a view showing detailed chapter setting information in a field 1803 shown in FIG. 18 in more detail.

FIG. 21 is a view showing detailed chapter setting information of the field 1803 shown in FIG. 18 in more detail. As shown in FIG. 21, detailed setting information for each chapter is sequentially stored from a field 2101.

Figure 22:
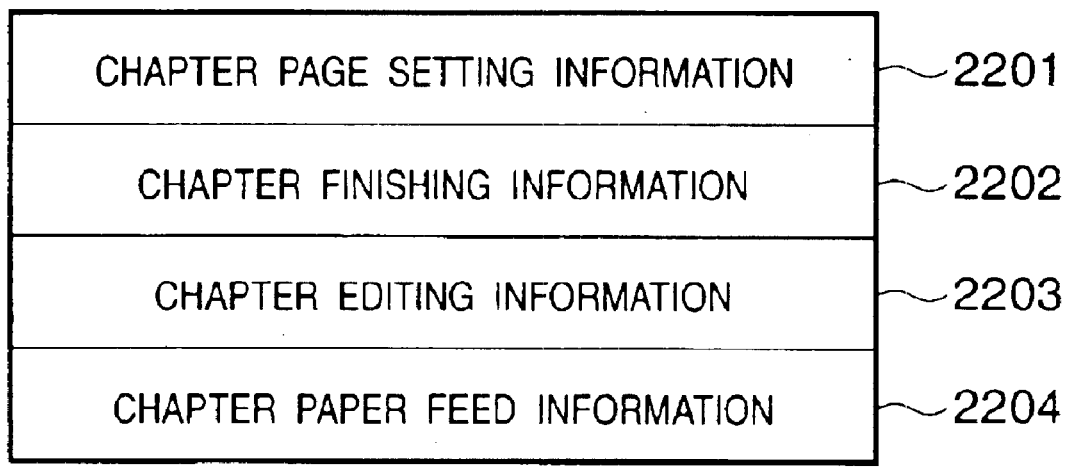
FIG. 22 is a view showing detailed setting information of each chapter shown in FIG. 21 in more detail.

FIG. 22 is a view showing detailed setting information for each chapter shown in FIG. 21 in more detail. Referring to FIG. 21, a field 2201 stores chapter page setting information; a field 2202, chapter finishing information; a field 2203, chapter editing information; and a field 2204, chapter paper feed information. These pieces of information coincide with contents set on the "page settings" 1701, "finishing" 1702, "edit" 1703, and "paper feed" 1704 sheets of the "detailed settings of chapter" window shown in FIG. 17.

Figure 23:
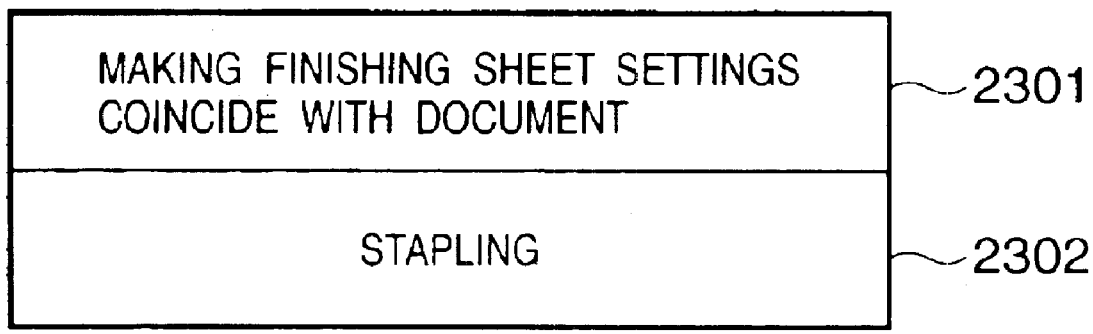
FIG. 23 is a view showing chapter finishing information in a field 2202 shown in FIG. 22 in more detail.

FIG. 23 is a view showing chapter finishing information of the field 2202 shown in FIG. 22. Referring to FIG. 23, a field 2301 stores "making finishing sheet settings coincide with document"; and 2302, "stapling". These pieces of information coincide with contents set on the "finishing" 1702 sheet of the "detailed settings of chapter" window shown in FIG. 17.

Processing of determining a staple attribute during editing a book file attribute by a user from the UI window of the bookbinding application 104.

Figure 24:
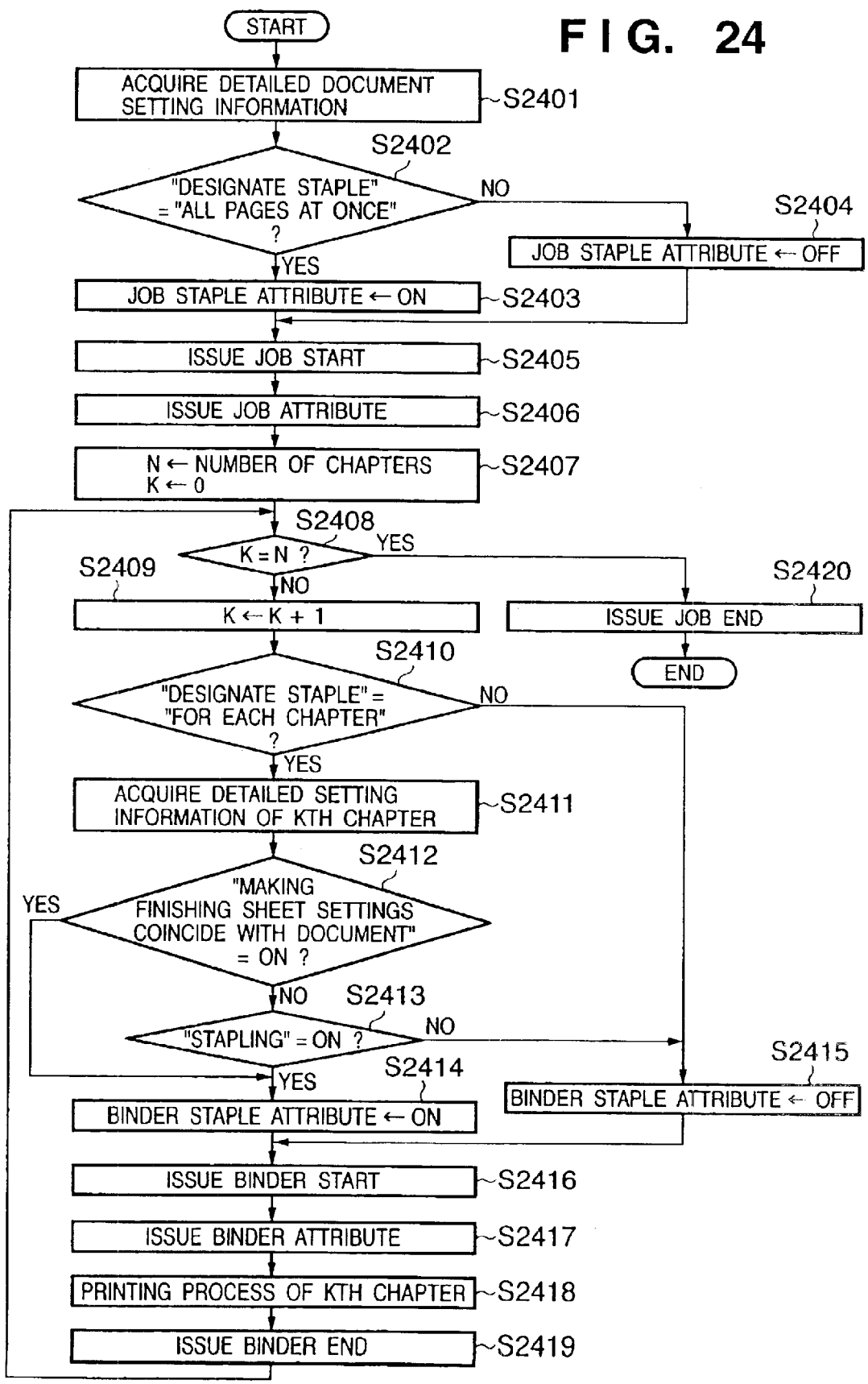
FIG. 24 is a flow chart showing setting processing by the bookbinding application 104.

FIG. 24 is a flow chart showing setting processing by the bookbinding application 104. In step S2401, the bookbinding application 104 acquires detailed document setting information of a document included in the book file 103 during editing, and thereafter, performs processing of determining the staple attribute of a job. In step S2402, whether "all pages at once" is set in the "designate staple" contained in detailed document setting information acquired in step S2401 is checked. If YES in step S2402, the flow shifts to step S2403 to change the staple attribute of a job to "ON". If NO in step S2402, the flow shifts to step S2404 to change the staple attribute to "OFF". Then a job start instruction is issued in step S2405, and a job attribute containing the staple attribute of the job is issued in step S2406.

In step S2407, the number of all chapters included in the book file 103 is set as a variable N, and the variable K of the chapters is initiated to 0. In step S2408, whether all the chapters are completely processed (K=N) is checked. If NO in step S2408, the flow shifts to step S2409 to increment the variable K, and processing of determining a staple attribute of a binder is performed in steps S2410 to S2415. A print job is made up of a plurality of binders, and each binder can define a set of finishing settings in a print job. The binder attribute contains a staple attribute, so a staple range can be designated in one print job.

In step S2410, whether "for each chapter" is set in the "designate staple" of the "detailed settings of document" window is checked. If NO in step S2410, since it means that staple instruction is not defined to the binder, the flow shifts to step S2415 to set "OFF" in the staple attribute of the binder. If YES in step S2410, the flow shifts to step S2411 to acquire detailed setting information of the Kth chapter which is currently printed. Subsequently, in step S2412, whether the "making finishing sheet settings coincide with document" setting contained in the acquired detailed setting information of the Kth chapter is "ON" is checked. If YES in step S2412, it means that the document settings instruct stapling for each chapter, and this chapter follows the document attribute, i.e., the setting of stapling for each chapter. Therefore, the flow shifts to step S2414 to set "ON" in the staple attribute of the binder.

If NO in step S2412, the flow shifts to step S2413 to check whether the "stapling" setting of the "detailed settings of chapter" window is "ON". If YES in step S2413, since it means that this chapter is stapled for each chapter, the flow shifts to step S2414 to set "ON" in the staple attribute of the binder. If NO in step S2413, since it means that the document attribute of stapling for each chapter is changed, and this chapter is not stapled, the flow shifts to step S2415 to set "OFF" in the staple attribute of the binder.

After the staple attribute of the binder is determined in step S2414 or S2415, the flow shifts to step S2416 to issue a binder start instruction, and the binder attribute containing the staple attribute of the binder is issued in step S2417. Subsequently, in step S2418, pieces of drawing information of pages included in the Kth chapter are read out from the original information of the field 1805, and printing processing is performed by the electronic original despooler 105. Thereafter, in step S2419, a binder end instruction is issued to end printing processing of the Kth chapter. The flow then returns to step S2408 to check whether printing processing for all the chapters ends. If NO in step S2408, the above processing is repeated. If YES in step S2408, since it means that the printing processing for all the chapters ends, the flow shifts to step S2420 to issue a job end instruction, and the printing processing of the book file 103 ends. Printing processing in this embodiment does not correspond to printing processing by a printer, but corresponds to processing in which the bookbinding application 104 makes the electronic original despooler generate drawing data and makes the printer driver generate print data (print job) via the OS.

How the processing shown in FIG. 24 is controlled among the bookbinding application 104, printer driver 106, and printer 107 will be described below with reference to FIG. 25.

FIG. 25 is a view showing a print sequence among the bookbinding application 104, printer driver 106, and printer 107. In the processes of the steps S2405 and S2406 shown in FIG. 24, while following the print processing procedures of the OS, the bookbinding application 104 executes print job generation processing, e.g., CreatedDC( ) or StartDoc( ) in the Windows OS. This processing is notified to the printer driver 106 via the GDI, and the printer driver 106 performs job generation processing and job attribute setting processing. More specifically, the printer driver 106 generates a command for instructing to the printer 107 a job attribute containing a job start instruction and a staple setting, and transmits the command to the printer 107 via a procedure by the OS for transmitting data to the printer 107.

The bookbinding application 104 executes ExtEscape (BINDER_START) in the processing of issuing a binder start instruction in step S2416 shown in FIG. 24, and notifies the printer driver 106 of the start of a binder which can designate an independent finishing attribute. More specifically, this means notification of the start of printing a chapter. The bookbinding application 104 then executes ResetDC( ) to notify the printer driver 106 of a binder attribute. More specifically, the bookbinding application 104 notifies the printer driver 106 of a binder attribute containing the staple setting of the chapter. By receiving these notifications, the printer driver 106 performs binder generation processing and binder attribution setting processing, in which the printer 107 is notified of the start of the binder. More specifically, the printer driver 106 generates a command for instructing to the printer 107 a binder attribute containing a staple setting instruction, and transmits the command to the printer 107 via a procedure by the OS for transmitting data to the printer 107.

Thereafter, the bookbinding application 104 notifies the printer driver 106 via the GDI of the drawing contends of each page contained in the binder in the processing of step S2418 in FIG. 24, i.e., the drawing contents of each original page included in the chapter. As described above, the printer driver 106 receives the drawing contents in the DDI format obtained by converting the GDI format, converts the received contents into a drawing instruction such as PDL interpretable by the printer, and transmits the drawing instruction to the printer 107.

The bookbinding application 104 notifies the printer driver 106 of the end of the current binder and the start of the next binder by using ExtEscape(BINDER_END) and ExtEscape(BINDER_START). Since these two notifications have the purpose of notifying the binder boundary, they can be combined into one notification for notifying a binder boundary.

The bookbinding application 104 repeats the above processing by the number of chapters. Finally, in step S2420 shown in the FIG. 24, while following printing processing procedure of the OS, the bookbinding application 104 executes print job end processing, e.g., EndDoc( ) in the Windows OS. This processing is notified to the printer driver 106 via the GDI, and the printer driver 106 performs job end processing. More specifically, the printer driver 106 generates a command for issuing a job end instruction to the printer 107, and transmits the command to the printer 107 via a procedure by the OS for transmitting data to the printer 107.

This embodiment exemplifies the practical API such as ExtEscape( ) and ResetDC( ) as means for performing notification from the bookbinding application 104 to the printer driver 106 via the GDI. However, the above-described processing can be obviously implemented even by using means other than the API as far as the bookbinding application 104 can execute printing processing in synchronization with the printer driver 106.

With this processing, a document and a document whose chapter undergoes staple settings can be transmitted to the printer 107 as one print job.

On the other hand, when receiving the job attribute setting by SetJob shown in FIG. 25 which contains staple instruction to the job, the printer 107 combines all pages obtained until JobEnd is received and staples all the pages together. When no staple is instructed to the job, and the binder attribute setting received by each SetBinder contains staple instruction to the binder, the printer 107 combines all pages which are included in the binder and obtained until BinderEnd is received, and staples all the pages together.

With this operation, this embodiment can execute stapling processing for a unitary print job or part of print job.

According to this embodiment, staple instruction can be performed to an arbitrary portion of a document. This allows to define staple settings to a plurality of parts of a document, respectively, and define staple setting to only one part of a document.

In addition, a plurality of jobs are bound into one job, so that a plurality of staple processes can be realized in one print job. This not only reduces the cumbersome operation but also, like the general print job, executes print job control such as stop of printing and status display with respect one print job in printing containing the plurality of staple processes. Further, no interrupts are generated from other print jobs even in a shared printer connected to a network.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the function of the above-described embodiment to a system or an apparatus, and causing the computer (or a CPU or an MPU) of the system or the apparatus to read out and execute the program codes stored in the storage medium.

In this case, the program codes read out from the storage medium realize the function of the above-described embodiment by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The function of the above-described embodiment are realized not only when the readout program codes are executed by the computer but also when the OS (Operating System) running on the computer performs part or all of actual processing on the basis of the instructions of the program codes.

The function of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the embodiment, the user can execute the staple designation to an arbitrary part in a document. In addition, a plurality of staple processes can be realized in one print job.

The present invention is not limited to the above embodiments and various changes and modifications can be made within the spirit and scope of the present invention. Therefore to apprise the public of the scope of the present invention, the following claims are made.

What is claimed is:

1. A document processing system constituted by a printing apparatus with a staple function and information processing apparatus connected to the printing apparatus, comprising:

setting means for setting a partial staple instruction, which instructs that one or more parts of a document are to be stapled by the printing apparatus, the document being comprised of a plurality of parts, wherein said setting means individually sets, for each of the plurality of parts into which the document is divided, whether to perform stapling for that part;

generation means for generating print data including the partial staple instruction for stapling each part as a print job in accordance with the partial staple instruction set by said setting means; and staple means for stapling each of the respective parts of the document which, according to the partial staple instruction, are to be stapled, printed on the basis of the generated print data, wherein said generation means generates the print data comprised of a plurality of partial print data, and each of the partial print data includes partial print attribute information for indicating the part to be stapled.

2. The system according to claim 1, wherein said setting means includes a user interface window, and a user sets said setting means from the user interface window.

3. A document processing system constituted by a printing apparatus with a staple function and information processing apparatus connected to the printing apparatus, comprising:

designation means for an operator to designate one of a first stapling mode and a second stapling mode, said first stapling mode being for stapling a whole document and said second stapling mode being one for stapling each of a plurality of parts of the document;

generation means for generating print data of the document into one job when the whole document is designated to be stapled, and generating print data in a plurality of jobs for jobs designated for stapling and jobs designated not for stapling when each of the plurality of parts of the document is designated to be stapled; and staple means for stapling the whole document, in said first stapling mode, and for stapling each of the plurality of parts of the document, in said second stapling mode, responsive to designation of one of said stapling modes by the designation means, printed on the basis of the generated print data, wherein said generation means generates the print data comprised of a plurality of partial print data when each of the plurality of parts of the document is designated to be stapled, and each of the partial print data includes partial print attribute information for indicating the part to be stapled.

4. The system according to claim 3, wherein said generation means generates binders corresponding to the plurality of jobs, and binds the binders to form one job.

5. An information processing apparatus connected to a printing apparatus with a staple function, comprising:

setting means for setting a partial staple instruction, which instructs that one or more parts of a document are to be stapled by the printing apparatus, the document being comprised of a plurality of parts, wherein said setting means individually sets, for each of the plurality of parts into which the document is divided, whether to perform stapling for that part; and generation means for generating print data including the partial staple instruction for stapling each part as a print job in accordance with the partial staple instruction set by said setting means, wherein said generation means generates the print data comprised of a plurality of partial print data, and each of the partial print data includes partial print attribute information for indicating the part to be stapled.

6. The apparatus according to claim 5, wherein said setting means includes a user interface window, and a user sets said setting means from the user interface window.

7. The apparatus according to claim 5, wherein said setting means individually sets whether to perform stapling for each of a plurality of parts, into which the document is divided.

8. The apparatus according to claim 5, wherein said setting means sets either a whole-staple instruction, to staple a whole document, or the partial-staple instruction.

9. The apparatus according to claim 5, wherein the information processing apparatus manages the document as a plurality of chapters, and said setting means sets whether to staple, for each chapter.

10. The apparatus according to claim 5, further comprising printing setting designation means for designating a changeover of printing setting to a printer driver at a timing at which a staple attribute is changed, in a case where the partial staple instruction has been set by said setting means.

11. An information processing apparatus connected to a printing apparatus with a staple function, comprising:

designation means for an operator to designate one of a first stapling mode and second stapling mode, said first stapling mode being for stapling a whole, document and said second stapling mode being one for stapling each of a plurality of parts of the document; and generation means for generating print data of the document into one job, responsive to designation of said first stapling mode by the designation means. and generating print data in a plurality of jobs for jobs designated for stapling and jobs designated not for stapling, responsive to designation of said second stapling mode by the designation means, wherein said generation means generates the print data comprised of a plurality of partial print data when each of the plurality of parts of the document is designated to be stapled, and each of the partial print data includes partial print attribute information for indicating the part to be stapled.

12. The apparatus according to claim 11, wherein said generation means generates binders corresponding to the plurality of jobs, and binds the binders to form one job.

13. A method of setting a document processing system constituted by a printing apparatus with a staple function and information processing apparatus connected to the printing apparatus, comprising:

a setting step, of setting a partial staple instruction, which instructs that one or more parts of a document are to be stapled by the printing apparatus, the document being comprised of a plurality of parts, wherein the setting step includes individually setting, for each of the plurality of parts into which the document is divided, whether to perform stapling for that part;

a generation step, of generating print data including the partial staple instruction for stapling each part as a print job in accordance with the partial staple instruction set in the setting step; and a staple step, of stapling the one or more parts of the document printed on the basis of the generated print data, wherein said generation step includes generating the print data comprised of a plurality of partial print data, and each of the partial print data includes partial print attribute information for indicating the part to be stapled.

14. A program for making a computer execute the setting method defined in claim 13.

15. A computer-readable storage medium which stores the program defined in claim 14.

16. A method of setting a document processing system constituted by a printing apparatus with a staple function and information processing apparatus connected to the printing apparatus, comprising:

a designation step, of an operator designation one of a first stapling mode and a second stapling mode, the first stapling mode begin for stapling a whole document and the second stapling mode being one for stapling each of a plurality of parts of the document;

a generation step, of generating print data of the document into one job when the whole document is designated to be stapled, and generating print data in a plurality of jobs for jobs designated for stapling and jobs designated not for stapling when each of the plurality of parts of the document is designated to be stapled; and a staple step, of stapling the whole document, in the first stapling mode, and of stapling each of the plurality of parts of the document, in the second stapling mode, responsive to designation of one of the stapling modes in the designation step, printed on the basis of the generated print data, wherein said generation step includes generating the print data comprised of a plurality of partial print data when each of the plurality of parts of the document is designated to be stapled, and each of the partial print data includes partial print attribute information for indicating the part to be stapled.

17. A program for making a computer execute the setting method defined in claim 16.

18. A computer-readable storage medium which stores the program defined in claim 17.

19. A method of setting an information processing apparatus connected to a printing apparatus with a staple function, comprising:

a setting step, of setting a partial staple instruction, which instructs that one or more parts of a document are to be stapled by the printing apparatus, the document being comprised of a plurality of parts, wherein the setting step includes individually setting, for each of the plurality of parts into which the document is divided, whether to perform stapling for that part; and a generation step, of generating print data including the partial staple instruction for stapling each part as a print job in accordance with the partial staple instruction set in the setting step, wherein said generation step includes generating the print data comprised of a plurality of partial print data, and each of the partial print data includes partial print attribute information for indicating the part to be stapled.

20. A program for making a computer execute the setting method defined in claim 19.

21. A computer-readable storage medium which stores the program defined in claim 20.

22. The method according to claim 19, wherein the setting step includes individually setting whether to perform stapling for each of a plurality of parts, into which the document is divided.

23. The method according to claim 19; wherein the setting step includes setting either a whole-staple instruction, to staple a whole document, or the partial-staple instruction.

24. The method according to claim 19, wherein the information processing apparatus manages the document as a plurality of chapters, and the setting step includes setting whether to staple, for each chapter.

25. The method according to claim 19, further comprising a printing setting designation step, of designating a changeover of printing setting to a printer driver at a timing at which a staple attribute is changed, in case where the partial-staple instruction has been set in said setting step.

26. A method of setting an information processing apparatus connected to a printing apparatus with a staple function, comprising:

a designation step, of an operator designating one of a first stapling mode and a second stapling mode, the first stapling mode being for stapling a whole document and the second stapling mode being one for stapling each of a plurality of parts of the document; and a generation step, of generating print data of the document into one job, responsive designation of the first stapling mode in the designation step, and generating print data in a plurality of jobs for jobs designated for stapling and jobs designated not for stapling, responsive to designation of the second stapling mode in the designation step, wherein said generation step includes generating the print data comprised of a plurality of partial print data when each of the plurality of parts of the document is designated to be stapled, and each of the partial print data includes partial print attribute information for indicating the part to be stapled.

27. A program for making a computer execute the setting method defined in claim 26.

28. A computer-readable storage medium which stores the program defined in claim 27.

* * * * *

UNITED STATES PATENT AND TRADEMARK OFFICE
CERTIFICATE OF CORRECTION

PATENT NO. : 6,896,426 B2 Page 1 of 1
APPLICATION NO. : 10/241568
DATED : May 24, 2005
INVENTOR(S) : Nakagiri It is certified that error appears in the above-identified patent and that said Letters Patent is hereby corrected as shown below:

COLUMN 18:
Line 5, "contends" should read -- contents --; and
Line 64, "respect" should read -- respect to --.

COLUMN 21:
Line 8, "whole," should read -- whole --;
Line 13, "means." should read -- means, --;
Line 59, "operator designation" should read -- operator designating --; and
Line 61, "begin" should read -- being --.

COLUMN 22:
Line 46, "claim 19;" should read -- claim 19, --; and
Line 67, "responsive" should read -- responsive to --.

Signed and Sealed this

Twenty-ninth Day of August, 2006

JON W. DUDAS
*Director of the United States Patent and Trademark Office*